(12) United States Patent
Fujisawa et al.

(10) Patent No.: US 7,149,502 B2
(45) Date of Patent: Dec. 12, 2006

(54) WIRELESS INFORMATION DISTRIBUTION SYSTEM, WIRELESS INFORMATION DISTRIBUTION DEVICE, AND MOBILE WIRELESS DEVICE

(75) Inventors: Teruhiko Fujisawa, Shiojiri (JP); Hiroyuki Chihara, Okaya (JP)

(73) Assignee: Seiko Epson Corporation, Tokyo (JP)

( * ) Notice: Subject to any disclaimer, the term of this patent is extended or adjusted under 35 U.S.C. 154(b) by 442 days.

(21) Appl. No.: 09/960,005

(22) Filed: Sep. 20, 2001

(65) Prior Publication Data

US 2002/0065711 A1 May 30, 2002

(30) Foreign Application Priority Data

Sep. 20, 2000 (JP) .............................. 2000-285882
Feb. 27, 2001 (JP) .............................. 2001-052886

(51) Int. Cl.
*H04M 3/42* (2006.01)
(52) U.S. Cl. ................................. 455/414.1; 455/456.6; 455/457
(58) Field of Classification Search ............. 455/412.1, 455/414.1–414.3, 431, 456.6, 457, 41.2–41.3, 455/552.1, 99; 340/572.1, 825.69
See application file for complete search history.

(56) References Cited

U.S. PATENT DOCUMENTS

| | | | | |
|---|---|---|---|---|
| 5,796,351 A | * | 8/1998 | Yabuki | 340/825.69 |
| 5,884,140 A | * | 3/1999 | Ishizaki et al. | 455/2.01 |
| 5,948,040 A | * | 9/1999 | DeLorme et al. | 701/201 |
| 6,542,812 B1 | * | 4/2003 | Obradovich et al. | 701/207 |
| 6,545,605 B1 | * | 4/2003 | Van Horn et al. | 340/572.1 |
| 6,549,625 B1 | * | 4/2003 | Rautila et al. | 380/258 |
| 6,640,098 B1 | * | 10/2003 | Roundtree | 455/414.2 |
| 6,650,902 B1 | * | 11/2003 | Richton | 455/456.3 |
| 6,714,797 B1 | * | 3/2004 | Rautila | 455/552.1 |
| 6,859,650 B1 | * | 2/2005 | Ritter | 455/406 |

FOREIGN PATENT DOCUMENTS

| | | |
|---|---|---|
| DE | 196 16 150 | 11/1997 |
| JP | 5-282317 | 10/1993 |
| JP | 09044754 A * | 2/1997 |
| JP | 10315971 A * | 12/1998 |
| JP | 410319139 A * | 12/1998 |
| WO | WO 94 11967 | 5/1994 |
| WO | WO 9411967 A1 * | 5/1994 |
| WO | WO 9511496 A1 * | 4/1995 |
| WO | WO 00/04730 | 1/2000 |
| WO | WO 00 11616 | 3/2000 |

OTHER PUBLICATIONS

"Bluetooth—The Universal Radio Interface For AD HOC, Wireless Connectivity"; Ericsson Review, Ericsson, Stockholm, SE, No. 3, 1998; pp. 110-117, XP000783249 ISSN: 0014-0171.
Digital Cellular Telecommunications System (Phase 2+) (GSM); Universal Mobile Telecommunications System (UMTS); Service Aspects; The Virtual Home Environment (3G TS 22.121 version 3.3.0 Release 1999), ETSI TS 122 121 V3.3.0 (Jun. 2000), pp. 1-23.

* cited by examiner

*Primary Examiner*—Melur Ramakrishnaiah

(57) ABSTRACT

Train information is distributed to a user wearing a mobile wireless device by a wireless information distribution device. The information is displayed on the mobile wireless device. The information received by the user is, for example, information about delay and suspension of trains, transfer stations, or transfer options.

18 Claims, 18 Drawing Sheets

FIG. 5

|  | PLATFORM No. | LINE | DESTINATION |
|---|---|---|---|
| PLATFORM INFORMATION OF B STATION | 1 | X-RAILWAY | A STATION |
| | 2 | Y-RAILWAY | C STATION |
| | 3 | Y-RAILWAY | D STATION |
| PLATFORM INFORMATION OF D STATION | 1 | Y-RAILWAY | C STATION |
| | 2 | Z-RAILWAY | E STATION |
| | 3 | Z-RAILWAY | F STATION |

} 431

B STATION GUIDE MAP

PLATFORM 1

PLATFORM 2
PLATFORM 3

TICKET GATE

} 432

WIRELESS INFORMATION DISTRIBUTION SYSTEM, WIRELESS INFORMATION DISTRIBUTION DEVICE, AND MOBILE WIRELESS DEVICE

TECHNICAL FIELD

The present invention relates to a wireless information distribution system, and a wireless information distribution device and a mobile wireless device, which together comprise the system.

BACKGROUND ART

Many kinds of entry/exit management systems utilizing noncontact IC (Integrated Circuit) cards have been introduced. A typical example is as follows:

A person who is qualified to obtain a service provided in a certain area, carries a noncontact IC card, which is able to transmit, by radio, information about certification of qualification for obtaining the service. A read/write device, which can carry out radio communication with the IC card when the IC card moves within a certain distance of the device, is equipped at an entrance of the area. When a user with the IC card moves within range of the read/write device, radio communication is carried out between the IC card and the read/write device. In the communication process, information about certification of qualification is transmitted from the IC card to the read/write device. As a result, the user is certified and permitted to enter the area.

Another type of entry/exit management systems has also been introduced, in which a cost of a service is automatically paid at an entrance/exit in addition to the control of entry/exit. A typical example is a system with automatic ticket gates provided at railway stations. In this system, a passenger carries the IC card which stores information about a departure station, destination and the fare. A read/write device is provided at each ticket gate. When the passenger passes through the gate, information about a destination and fare is transmitted from the IC card to the read/write device, and the fare is settled after qualification for utilizing the railway is certified.

However, it is sometimes the case that after a user enters a certain area to obtain certain service, an unexpected incident occurs which prevents the user from obtaining the service. For example, in a case where train service is unexpectedly suspended, passengers generally have to watch notice boards or listen to announcements carefully. Alternatively, passengers may locate station staff and consult them for information; although station staff do not necessarily have information relating to, for example, an accident which may have occurred suddenly at a distant place. In the case that, for example, such an accident occurs, it can be difficult to provide information to a large number of passengers rapidly and accurately.

In some cases, a user may be dissatisfied with a service due to a lack of information. For example, in train stations, passengers generally have to obtain information about which platforms to proceed to or which route to take in transferring. To do so, they are required to observe notice boards or to listen to announcements. This can be a cause of inconvenience to both train passengers and station staff.

DISCLOSURE OF INVENTION

The present invention has as its object the rapid and accurate provision of information which may be necessary for users of transport services to access, such as information about transfers or information which may be required urgently, such as information about a suspension of a train service.

To satisfy this requirement, the wireless information distribution system of the present invention comprises:
a wireless information distribution device and a portable wireless device;
the wireless information distribution device comprising:
an external transmitting/receiving device for carrying out wireless communication with the portable wireless device;
a memory for storing service information; and
a control unit for retrieving from the memory, responsive and corresponding to a service information request sent by the portable wireless device to the external transmitting/receiving device, when within range, service information for transmission to the portable wireless device, and transmitting the retrieved service information to the portable wireless device; and
the portable wireless device comprising:
a display;
a memory for storing a service information request;
a transmitting/receiving unit for carrying out, when within range, wireless communication with the wireless information distribution device; and
a control unit for transmitting via the transmitting/receiving unit a communication-ready signal and service information request stored in the memory of the portable wireless device to the external transmitting/receiving device, and for displaying service information sent, in response to the service information request, from the external transmitting/receiving device on the display.

In a preferred embodiment of the system, the external transmitting/receiving device transmits a communication request signal at regular intervals; and
the control unit of portable wireless device, when receiving the communication request signal via the transmitting/receiving unit, transmits the service information request via the transmitting/receiving unit.

In another preferred embodiment of the system, the service information request is for user transportation information, which information includes a departure point and destination point of a user; the memory of the wireless information distribution device storing service information relating to movement of transportation means; and the control unit of the wireless information distribution device retrieving from the memory, service information about movement of a transportation means specified in the service information request.

In another preferred embodiment of the system, the service information request is for user transportation information which includes a departure point and destination point of a user; the memory of the wireless information distribution device storing information on various departure points and destinations, and various corresponding transportation means, transfer points, and transfer options at the various transfer points usable in traveling from the various transportation departure points to the various destination points; and the control unit of the wireless information distribution device retrieving from the memory of the wireless information distribution device, service information corresponding to the service information request.

In another preferred embodiment of the system, said service information request includes information for identifying a user and entry/exit request of the user;

the wireless information distribution device having an entry/exit controlling device; and the external transmitting/receiving device being provided in the vicinity of the entry/exit controlling device; and wherein when the control unit of the wireless information distribution device receives an entry/exit request via the transmitting/receiving device, the control unit judges whether to allow the request, and controls the entry/exit controlling device based on the judgment.

In another preferred embodiment of the system, the service information request includes user attributes;

the memory of the wireless information distribution device storing the service information and corresponding user attributes; and the control unit of the wireless information distribution device retrieving from the memory of the wireless information distribution device, service information corresponding to the user attributes.

In another preferred embodiment of the system, the service information received by the portable wireless device is real-time based information. In another preferred embodiment of the system, the service information received by the portable wireless device is local-specific information.

A wireless information distribution device which is utilized in the information distribution system of the present invention comprising:

a memory for storing service information;

an external transmitting/receiving device for carrying out radio communication with mobile wireless device located within range of the external transmitting/receiving device; and a control unit for retrieving from the memory, responsive and corresponding to a service information request sent by the portable wireless device to the external transmitting/receiving device, when within range, service information for transmission to the portable wireless device, and transmitting the retrieved service information via the external transmitting/receiving device.

In a preferred embodiment of the wireless information distribution device, the wireless information distribution has an entry/exit controlling device;

an external transmitting/receiving device is provided in the vicinity of the entry/exit controlling device;

the control unit, when receiving user information for identifying a user and a user entry/exit request, judges whether to allow the request, thereby controlling the entry/exit controlling device based on the judgment.

In another preferred embodiment of the wireless information distribution device, the service information request includes user attributes;

the memory stores the service information and corresponding the user attributes; and the control unit retrieves, from the memory, service information corresponding to the user attributes included in the service information request.

In another embodiment of the wireless information distribution device, the service request information is for user transportation information including a departure point and destination point of a user; the memory stores movement of transportation means information; and the control unit retrieves, from the memory, service information about movement of the transportation means specified in the user transportation information.

In another preferred embodiment of the wireless information distribution device, the service information request is for user transportation information including a departure point and destination point of a user;

the memory stores information on various departure points and destinations, and various corresponding transformation means, transfer options at the various transfer points usable in traveling from a departure point to the destination point; and the control unit retrieves information on the transportation means, transfer points, and methods for transferring in traveling from the departure point to the destination point.

It is possible for the information about methods of transferring to include information about stairs, escalators, or elevators available to the user. It is also possible for the information about transfer points to include time available to the user in changing transportation means. The transportation means may includes one of a train, bus, airplane, or ship. It is also possible for the external transmitting/receiving device to transmit, at regular intervals, a communication request signal.

A portable wireless device, which is utilized in the wireless information distribution of the present invention, for carrying out radio communication with an external transmitting/receiving device is comprised of a wireless information distribution device which in turn comprises:

a transmitting/receiving unit for carrying out radio communication;

a memory for storing service information request;

a display; and a control unit, for transmitting, when within range, a communication ready signal and a service information request to the external transmitting/receiving device, and for displaying service information sent, in response to the service information request, from the external transmitting/receiving device.

In a preferred embodiment of the portable wireless device, the memory further stores user information for identifying the user; and the service information request includes the user information and user entry/exit request.

In another preferred embodiment of the portable wireless device, the memory includes user attributes;

the service information request includes the user attributes; and the service information received via the transmitting/receiving unit corresponds to the user attributes.

In another preferred embodiment of the portable wireless device, the memory stores user transportation information including a departure point and destination point of a user;

the service information request includes the user transportation information; and the service information received via the transmitting/receiving unit is for information about movement of the transportation means specified in the user transportation information.

In another preferred embodiment of the portable wireless device, the service information request is for user transportation information on user transportation means, including a departure point and destination of a user; and the service information received via the transmitting/receiving unit is for information on the transportation means, transfer points, and methods for transferring in traveling from the departure point to the destination point.

In another preferred embodiment of the portable wireless device, the transmitting/receiving unit carries out radio communication with the external transmitting/receiving device only upon receiving a communication request signal sent from the external transmitting/receiving device.

It is possible for the display unit to display the time for a predetermined period after receiving the service information via the external transmitting/receiving device.

The present invention also includes a method for controlling a wireless information distribution device. The information distribution device comprises:
a memory for storing service information;
an external transmitting/receiving device for carrying out radio communication with a portable wireless device when within range; and
a control unit;

the method comprising the steps of:
storing service information;
receiving a service information request of a user of the portable wireless device;
retrieving service information corresponding to the service information request; and
transmitting the retrieved service information via the external transmitting/receiving device.

In a preferred embodiment of the method for controlling a wireless information distribution device, the wireless information distribution device has an entry/exit controlling device; and
the external transmitting/receiving device is provided in the vicinity of the entry/exit controlling device;

the method further comprising the steps of:
receiving user information for identifying a user, and an entry/exit request of a user;
judging whether to give permission for the request; and
controlling the entry/exit controlling device, based on the judgment.

In another preferred embodiment of the method for controlling a wireless information distribution device, the service information request includes user attributes;

the method further comprising the steps of:
storing the user attributes corresponding to the service information; and
retrieving the service information corresponding to the user attributes.

In another preferred embodiment of the method for controlling a wireless information distribution device, the service information request is for user transportation information including a departure point and destination point of a user;

the method comprising the steps of:
determining the transportation means corresponding to the user transportation information included in the service information request; and
retrieving the service information about movement of the specified transportation means.

In another preferred embodiment of the method for controlling a wireless information distribution device, the service information request is for user transportation information including a departure point and destination of a user;

the method comprising the steps of:
storing information on various departure points and destinations, and various corresponding transformation means, transfer options at the various transfer points usable in traveling from a departure point to the destination point;
retrieving service information corresponding to the user transportation information included in the service information request.

The present invention further includes a method for controlling a portable wireless device. The portable wireless device comprising:
a memory for storing service information desired by a user of the portable wireless device;
a transmitting/receiving unit for carrying our radio communication, when within range, with an external transmitting/receiving device composed of a wireless information distribution device; and
a display; and the method comprising the steps of:
when entering into a radio communication range of the external transmitting/receiving device, transmitting a communication-ready signal to the external transmitting/receiving device and a service information request;
receiving from the external transmitting/receiving device service information in response to the service information request; and
displaying the service information on the display.

In a preferred embodiment of the method for controlling a portable wireless device, the service information request includes user information for identifying a user of the portable wireless device, and an entry/exit request of the user.

In another preferred embodiment of the method for controlling a portable wireless device, the service information request includes user attributes; and
the service information received via the transmitting/receiving unit corresponds to the user attributes.

In another preferred embodiment of the method for controlling a portable wireless device, the service information request is user transportation information including a departure point and destination point of a user; and
the service information received via the transmitting/receiving unit includes information about movement of the transportation means specified in the user transportation information.

In another embodiment of the method for controlling a portable wireless device, service information request is user transportation information including a departure point and destination point of a user; and
the service information received via the transmitting/receiving unit is information about itinerary of the user including transportation means to travel from the starting point to the destination, transfer points, and methods for transferring, which is corresponding to the user transportation information included in the service information request.

The present invention also includes a computer program for controlling a wireless information distribution device. The information distribution device comprises:
a memory for storing service information;
an external transmitting/receiving device for carrying out radio communication with a portable wireless device located within range of the external transmitting/receiving device; and the computer program comprising the steps of:
storing service information;
receiving a service information request via the external transmitting/receiving device;
retrieving service information corresponding to the service information request; and
transmitting the retrieved service information via the external transmitting/receiving device.

In a preferred embodiment of the computer program for controlling a wireless information distribution device, the wireless information distribution device has an entry/exit controlling device; and
the external transmitting/receiving device is provided in the vicinity of the entry/exit controlling device;

the program further comprises the steps of:

receiving user information for identifying a user, and an entry/exit request of a user;

judging whether to give permission for the request; and controlling the entry/exit controlling device, based on the judgment.

In another preferred embodiment of the program for controlling a wireless information distribution device, the service information request includes user attributes; and the program further comprising the steps of:

storing the user attributes corresponding to types of service information; and retrieving the service information corresponding to the user attributes.

In another preferred embodiment of the program for controlling a wireless information distribution device, the service information request is for user transportation information including a departure point and destination of a user. The program comprises the steps of:

specifying the transportation means corresponding to the user transportation means included in the received service information request; and collecting the service information about movement of the specified transportation means.

In another preferred embodiment of the program for controlling a wireless information distribution device, the service information request is for user transportation means including a departure point and destination of a user. The program comprises the steps of:

storing information on various departure points and destinations, and various corresponding transformation means, transfer options at the various transfer points usable in traveling from a departure point to the destination point;

retrieving service information corresponding to the user transportation information included in the service information request.

The present invention also includes a computer program product for controlling a portable wireless device. The portable wireless device comprises:

a memory for storing a service information request for information desired by a user of the portable wireless device;

a display; and carrying out radio communication, with an external transmitting/receiving device of a wireless information distribution device, when entering in range of the external transmitting/receiving device; and the computer program comprising the steps of:

transmitting to the external transmitting/receiving device via the transmitting/receiving unit, when within range, a communication-ready signal and the service information request stored in the memory;

receiving service information via the external transmitting/receiving device, in response and corresponding to the service information request; and displaying the requested service information on the display.

In a preferred embodiment of the program for controlling a portable wireless device, the service information request is user transportation information including a departure point and destination point of a user; and the service information received via the transmitting/receiving unit includes information about movement of the transportation means specified in the user transportation information.

In another preferred embodiment of the program for controlling a portable wireless device, service information request is user transportation information including a departure point and destination point of a user; and the service information received via the transmitting/receiving unit is information about itinerary of the user including transportation means to travel from the starting point to the destination, transfer points, and methods for transferring, which is corresponding to the user transportation information included in the service information request.

The present invention includes a computer-readable storage media in which a computer program for controlling a wireless information distribution device is stored. The information distribution device comprises:

a memory for storing service information;

an external transmitting/receiving device for carrying out radio communication with a portable wireless device located within range of the external transmitting/receiving device; and the computer program comprising the steps of:

storing service information;

receiving a service information request via the external transmitting/receiving device;

retrieving service information corresponding to the service information request; and transmitting the retrieved service information via the external transmitting/receiving device.

In a preferred embodiment of the storage media in which a computer program for controlling a wireless information distribution device is stored, the wireless information distribution device has an entry/exit controlling device; and the external transmitting/receiving device is provided in the vicinity of the entry/exit controlling device;

the program further comprises the steps of:

receiving user information for identifying a user, and an entry/exit request of a user;

judging whether to give permission for the request; and controlling the entry/exit controlling device, based on the judgment.

In another preferred embodiment of the computer-readable storage media in which a computer program product for controlling a wireless information distribution device is stored, the service information request includes user attributes; and the program further comprising the steps of:

storing the user attributes corresponding to types of service information;

and retrieving the service information corresponding to the user attributes.

In another preferred embodiment of the computer readable storage media in which a computer program for controlling a wireless information distribution device is stored, the service information request is for user transportation information including a departure point and destination of a user. The program comprises the steps of: specifying the transportation means corresponding to the user transportation means included in the received service information request; and retrieving the service information about movement of the specified transportation means.

In another preferred embodiment of the storage media in which a computer program for controlling a wireless information distribution device is stored, the service information request is for user transportation means including a departure point and destination of a user. The program comprises the steps of:

storing information on various departure points and destinations, and various corresponding transformation means, transfer options at the various transfer points usable in traveling from a departure point to the destination point;

retrieving service information corresponding to the user transportation information included in the service information request.

The present invention also includes a computer-readable storage media in which a computer program for controlling a portable wireless device is stored. The portable wireless device comprises:

a memory for storing service information request;

a display; and carrying out radio communication with an external transmitting/receiving device comprised of a wireless information distribution device, when entering in range of the external transmitting/receiving device; and the computer program comprises steps of:

transmitting a communication-ready signal and the service information request stored in the memory, via the transmitting/receiving unit, to the external transmitting/receiving device;

receiving service information via the external transmitting/receiving device, in response to the service information request; and displaying received service information on the display.

In a preferred embodiment of the storage media in which a computer program product is stored for controlling a portable wireless device, the service information request is user transportation information including a departure point and destination point of a user; and the service information sent from the external transmitting/receiving device includes information about movement of the transportation means specified in the user transportation information.

In another preferred embodiment of the storage media in which a computer program product for controlling a portable wireless device is stored, service information request is user transportation information including a departure point and destination point of a user; and the service information received via the transmitting/receiving unit is information about itinerary of the user including transportation means to travel from the starting point to the destination, transfer points, and methods for transferring, which is corresponding to the user transportation information included in the service information request.

BRIEF DESCRIPTION OF THE DRAWINGS

FIG. 5 shows typical contents of a transfer station information memory 43a.

BEST MODE FOR CARRYING OUT THE INVENTION

Embodiments based on the present invention will be described referring to the figures.

1. FIRST EMBODIMENT

A: Configuration of the First Embodiment

Figure 1:
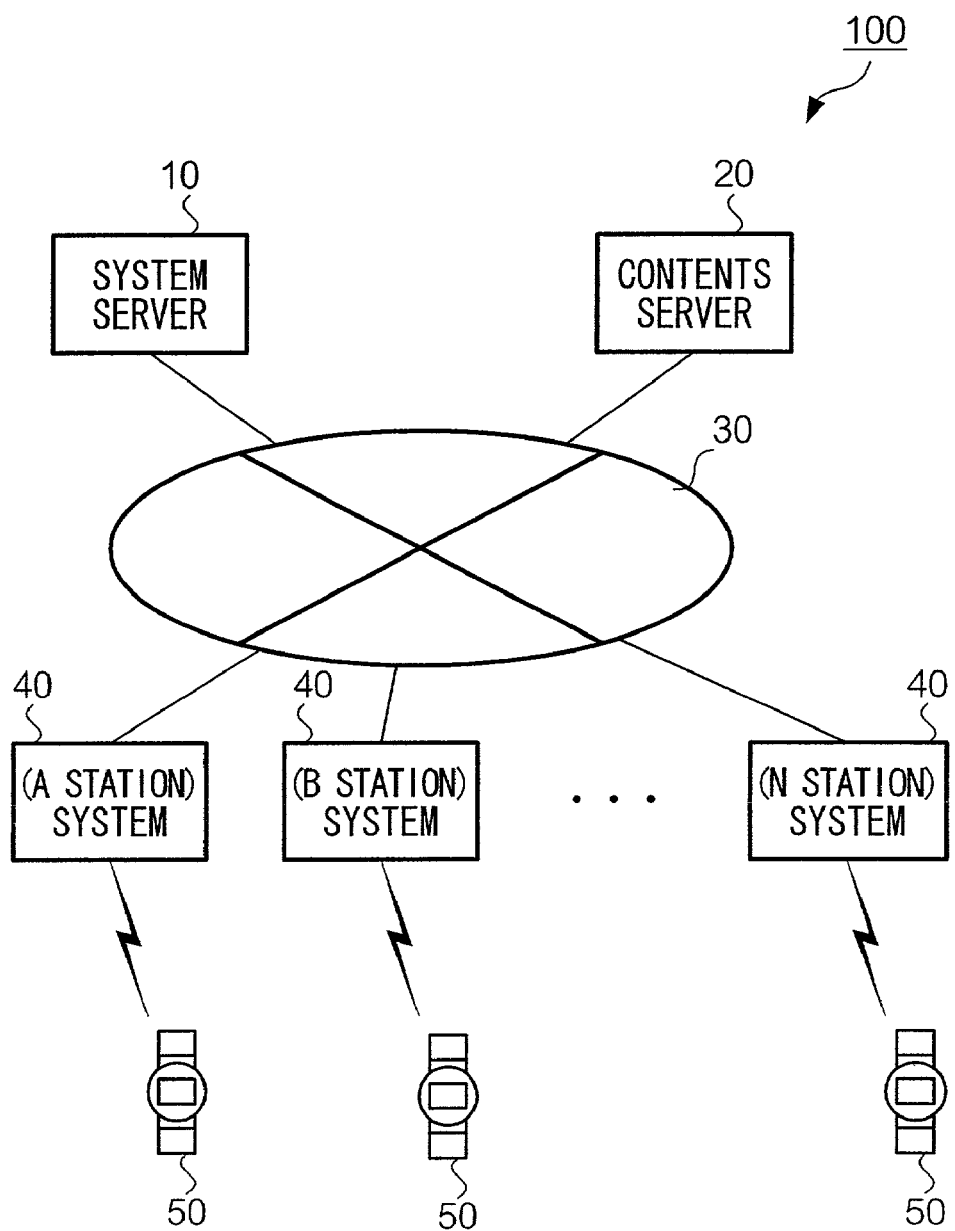
FIG. 1 illustrates a transfer information system based on the first embodiment.

FIG. 1 shows a configuration of a train transfer information system 100 to which the present invention is applied. The transfer information system 100 comprises: a system server 10; a contents server 20; a public network 30; station systems 40; and wristwatch-shaped information devices 50 (hereinafter simply described as a wrist watch 50). The system server 10 controls the entire system 100. Station systems 40 are provided in each station.

The system server 10 is connected to all of the station systems 40 via public network 30 for exchange of data between station systems 40. For example, if a train service is unexpectedly suspended due to an occurrence of an accident, system server 10 receives information about the accident and suspension of the train from a first station system 40 belonging to the station nearest to where the accident has occurred, and transmits the information to each of the other station systems 40. Contents sever 20 manages information to be provided to passengers (users), such as transfer information or service information, as will be described later. Contents server 20 is, similar to system server 10, connected to station systems 40 via the public network and is able thereby to transmit various kinds of information to each of station systems 40.

Figure 2:
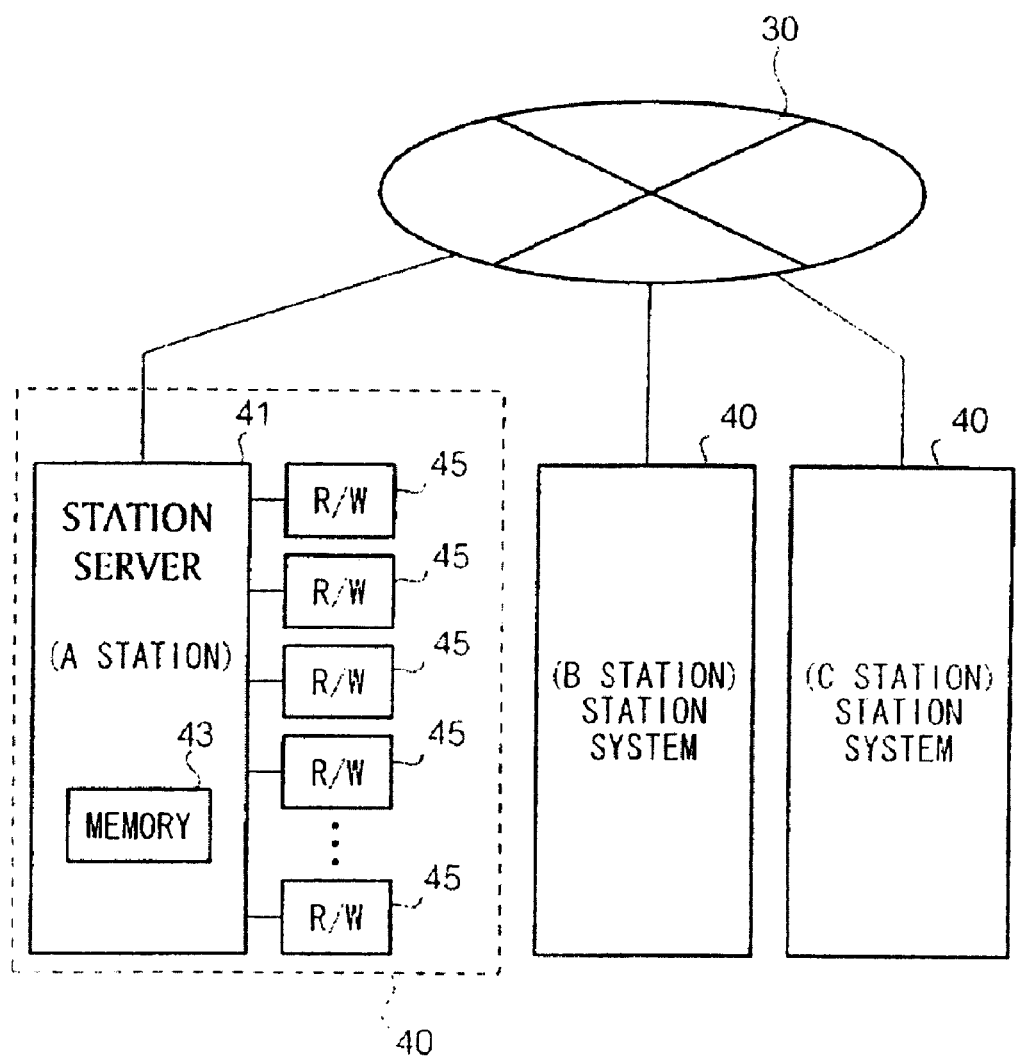
FIG. 2 shows a station system 40.

FIG. 2 shows a configuration of one of station systems 40. As shown, this station system 40 has a station server 41 and a plurality of read/write devices 45. Station server 41 has a control unit (not shown) for adjusting fares; controlling a user's entry or exit; and providing information to users. Specifically, station server 41, firstly, verifies ticket data of a user and controls the user's entry or exit. Further, station server 41 calculates adjustments in fares. In addition, station server 41 stores in a memory 43 information sent by system server 10 (FIG. 1), and transmits it via one of the read/write devices 45 to wristwatch 50. A computer program stored in the control unit (not shown) executes these operations.

Figure 3:
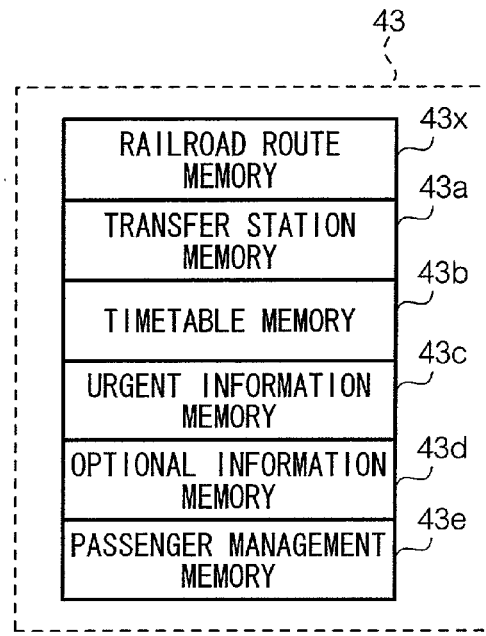
FIG. 3 shows a configuration of a memory 43 of the station system 40.
Figure 4:
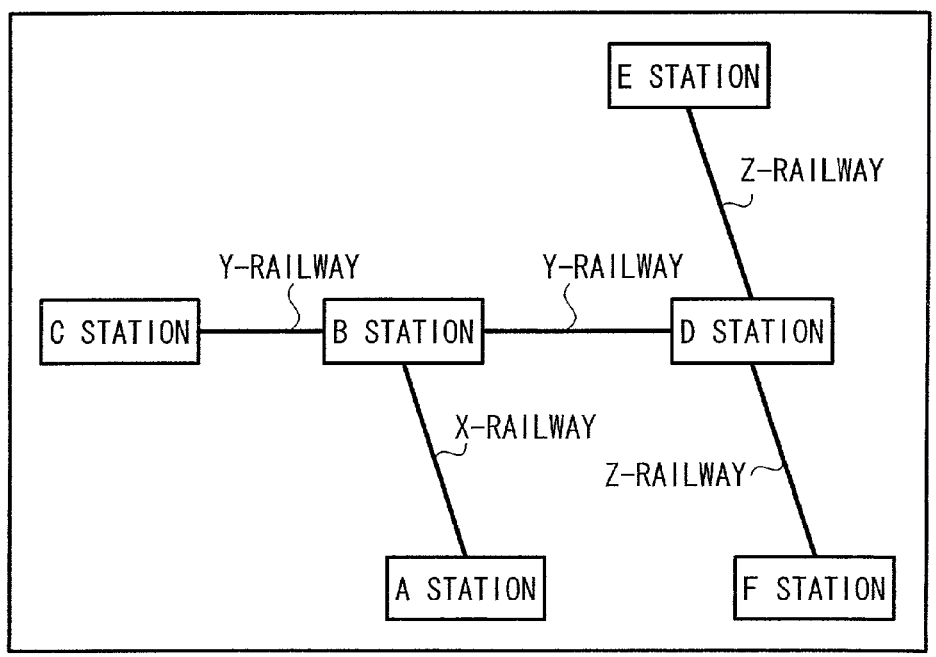
FIG. 4 shows typical contents of a route information memory 43x.

FIG. 3 shows a typical configuration of a memory 43. As shown, memory 43 comprises a railroad route memory 43x; a transfer station memory 43a; a timetable memory 43b; an urgent information memory 43c; optional information memory 43d; and a passenger management memory 43e. Railroad route memory 43x stores information about traffic diagrams of trains which the system 100 covers. FIG. 4 shows an example of contents stored in railroad route memory 43x. For ease of understanding, it can be presumed that for the sake of explanation, as illustrated in FIG. 4, there are three railways X, Y, and Z, and 6 stations A, B, C, D, E, and F as in this embodiment. While this explanation is limited to a determinate number of railways and stations, in actuality, information about all stations which the system 100 covers is stored in the memory 43x.

Station server 41 recognizes which stations a user will be required to use in transferring transportation means, by referring to railroad route memory 43x upon receiving information about a departure point and destination of the user. Transfer memory 43a stores information about transfer stations which the system 100 covers. In this embodiment, a transfer station refers to a station at which a plurality of trains arrive and depart from, and at which a user can transfer. In FIG. 4, B station and D station correspond to such stations.

FIG. 5 shows typical contents stored in transfer station memory 43a. Memory 43a has platform information 431 and platform guide map 432. Platform information 431 includes information about platform numbers; railway names; and platform arrival and departure information, and destinations of trains from each transfer station (here B and D stations). As shown, such information is categorized and stored for correspondences Information 431 enables a user to obtain information about which platform a user needs to use in moving from, or in transferring to, a transfer station. Platform guide map 432 contains information about locations of stairs, ticket gates and other facilities provided in a transfer station (here B and D stations).

FIG. 5 shows platform guide map 432 of B station. Information 432 is designed to inform a user which route and platform for transfer is most appropriate. Timetable memory 43b stores timetables of trains which system 100 covers. Urgent information memory 43c contains urgent information about delays which may have occurred, for example, due to inclement weather, accident and so on. Thus, in the event that train is delayed, as a result of, for example, an accident, system server 10 transmits relevant information to each station server 41, and the information is stored in urgent information memory 43c of each station server 41. Optional information memory 43d stores additional service information, such as for lunch box shops in a station, business hours of kiosks, or stores along a line.

Furthermore, service information registered by users beforehand in contents server 20 is also stored in memory 43d. Passenger management memory 43e stores information about passengers who use a station where station server 41 is provided, including a number of passengers who have used the station or a railway, and an amount of a fare a user has paid.

Figure 6:
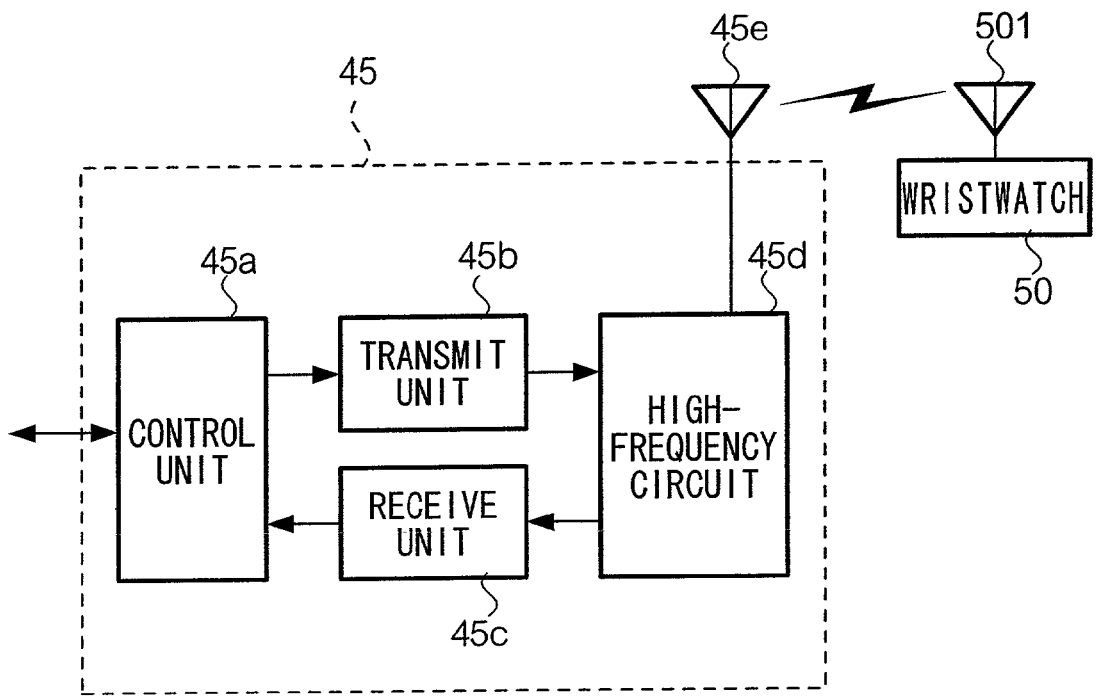
FIG. 6 shows a configuration of a read/write device 45 used in the system.

A configuration of read/write device 45 will now be described. FIG. 6 shows a configuration of the device. As shown, read/write device 45 comprises a control circuit 45a which controls whole device 45, a high frequency circuit 45d which communicates with an external device through an antenna 45e, a transmit circuit 45b which generates and output signal to high frequency circuit 45d being controlled by control circuit 45a, and a receive circuit 45c which demodulates signal inputted from high frequency circuit 45d and outputs it as receipt data to control circuit 45a. Frequency of the signal output from transmit circuit 45a is generally 13.5 or 125 MHz. The communication range of an output signal with the above frequency is from a few centimeters to several dozen centimeters, thus a user has to bring wristwatch 50 near to antenna 45e to exchange information by radio.

Figure 7:
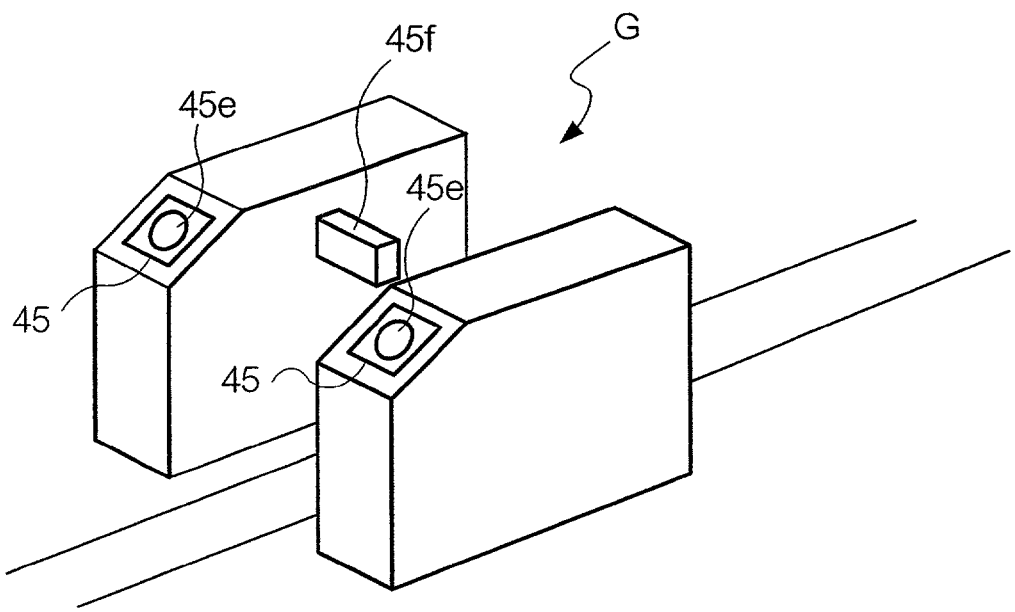
FIG. 7 shows an example of placement of the read/write device 45.
Figure 8:
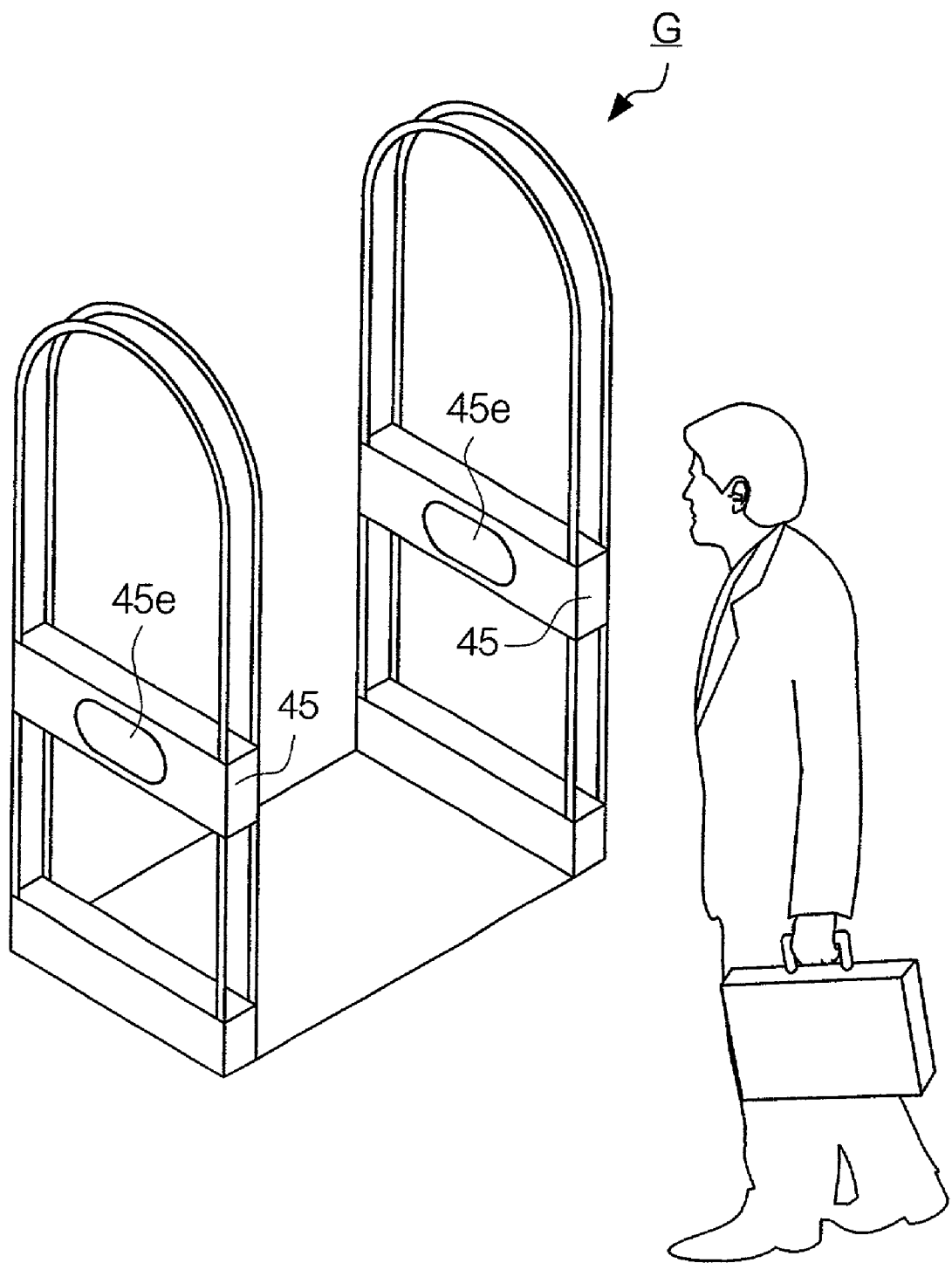
FIG. 8 shows an example of placement of the read/write device 45.

FIGS. 7 and 8 are external perspective views of the read/write device 45 provided at a ticket gate terminal G of a station. As shown, loop antennas 45e are embedded in gate terminal G, which includes gate 45f, to exchange data. When a user approaches gate terminal G and a wristwatch 50 and loop antenna 45e come within a predetermined distance of each other, bi-directional data communication by radio is carried out between read/write device 45 and wristwatch 50.

Figure 9:
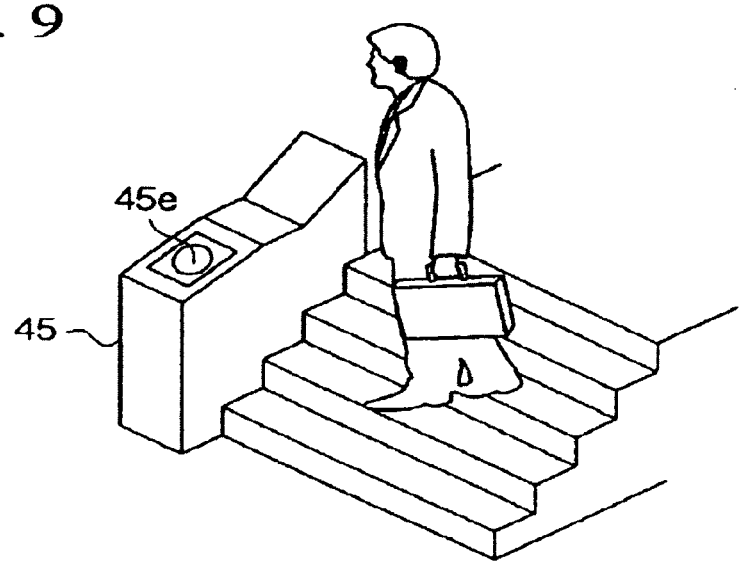
FIG. 9 shows an example of placement of the read/write device 45.
Figure 10:
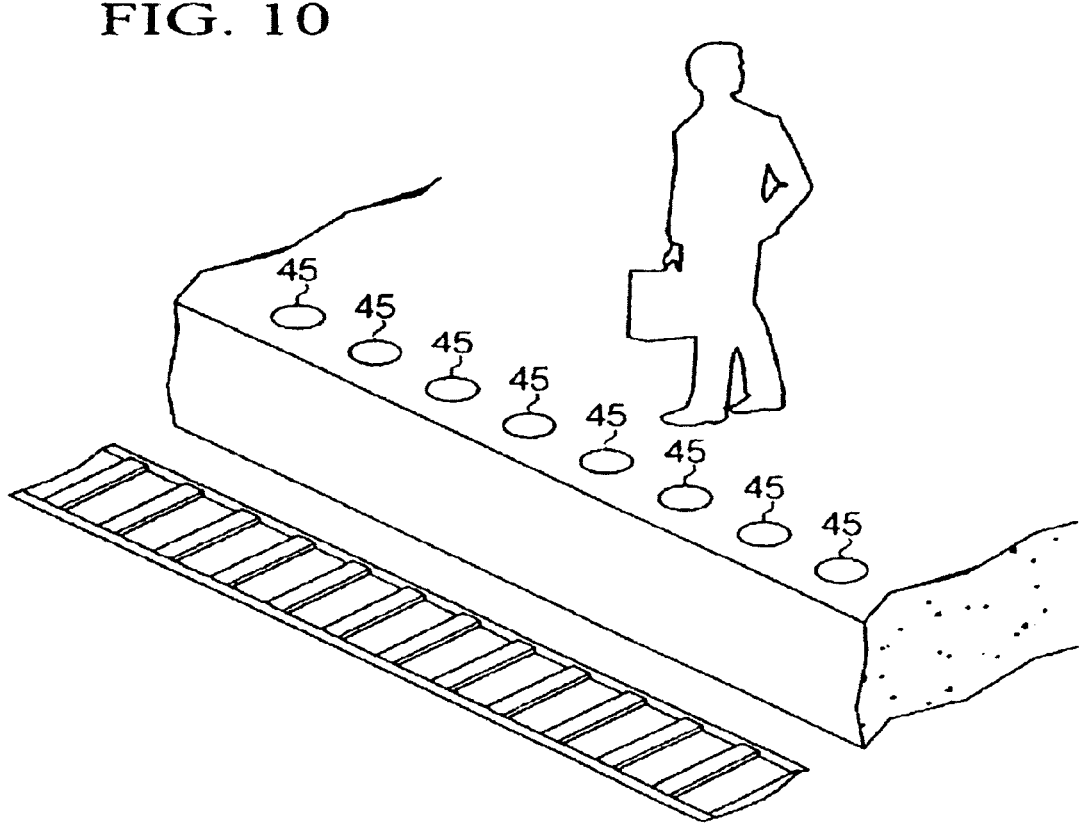
FIG. 10 shows an alternate example of placement of the read/write device 45.

It is possible for read/write circuits 45 to be provided beside stairs, as shown in FIG. 9 or embedded in a platform, as shown in FIG. 10, in system 100. Providing read/write circuits 45 in various locations in a station enables users to acquire updated information easily.

Figure 11:
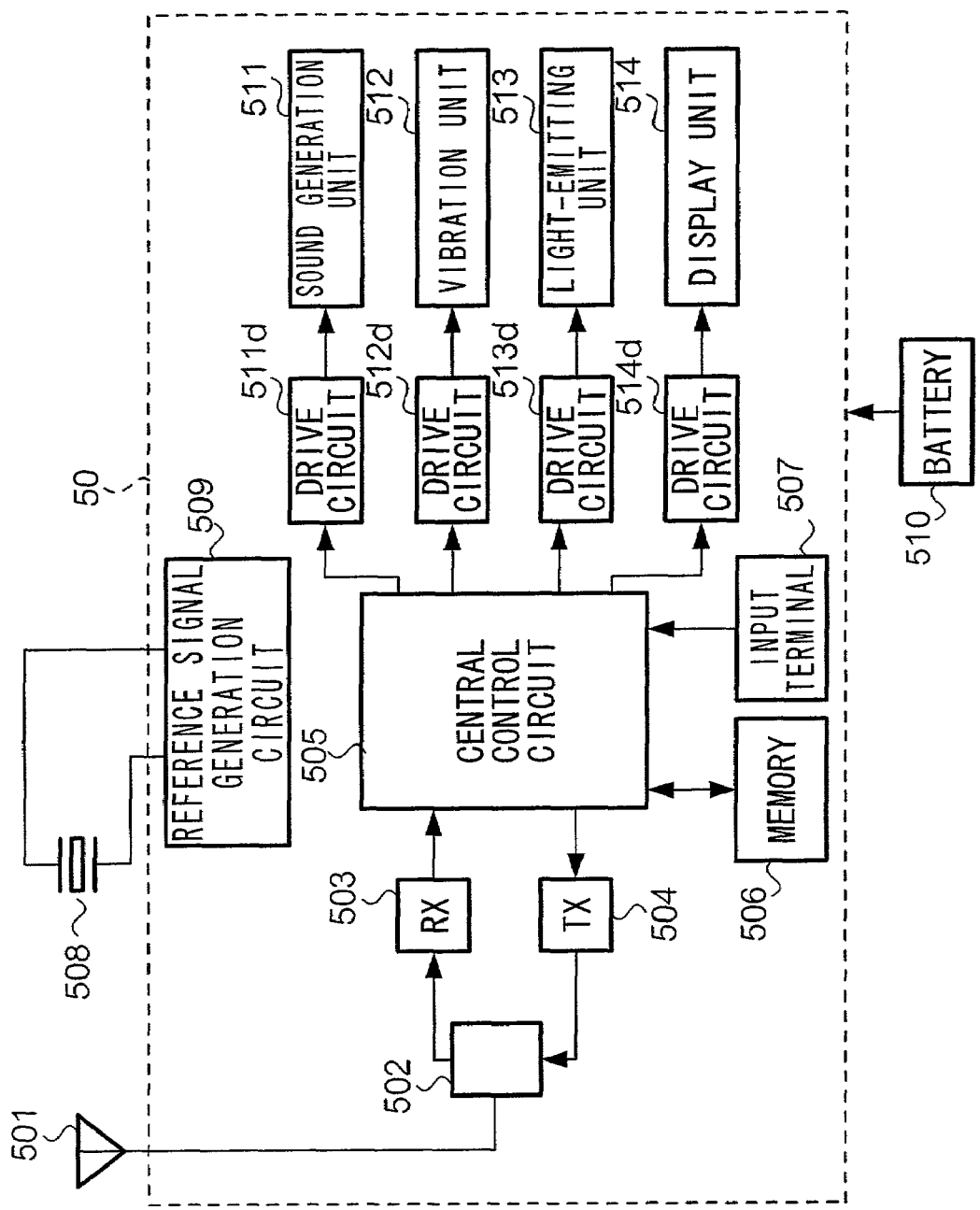
FIG. 11 illustrates a configuration of a watch 50 used in the system.

There will now be described a configuration of a wristwatch 50. FIG. 11 is a block diagram showing the outline of a configuration of wristwatch 50. Wrist watch 50 has a central control circuit 505 which controls all of wristwatch 50; an antenna 501; a switching circuit 502, which switches back and forth between receive circuit 503 and transmit circuit 504; a receive circuit 503 which demodulates a signal received from read/write circuit 45 via antenna 501 and outputs it as receipt data; and a transmit circuit 504 which modulates a signal input from central control circuit 505 and transmits it to read/write circuit 45 via antenna 501.

Furthermore, wristwatch 50 has a sound generating unit 511 to notify the user of various kinds of information being driven by a drive circuit 511d; a vibration unit 512 to notify the user of a status of wristwatch 50 by vibration, a light-emitting unit 513 having a light emitting device such as LED to notify the user of a status of wristwatch 50 by light being driven by a drive circuit 513d; and a display unit 514 comprising a liquid crystal display panel to notify the user of information. In addition, wristwatch 50 has an input terminal 507 for a user to operate; an oscillator 508 to generate a clock with a reference frequency; a reference signal generation circuit 509 which generates and outputs clocks divided by the clock with a reference frequency; a nonvolatile memory 506, in which a unique ID number which specifies a user of wristwatch 50 and a user traffic information; and a battery 510 which provides power to wristwatch 50. A source voltage is usually supplied only from battery 510. In addition, it is possible to rectify a carrier wave transmitted from a read/write circuit 45 to generate a power supply during communication by radio. Central control circuit 505 has a CPU, RAM, ROM, and other suitable elements (not shown in FIG. 11) and, further, an encryption circuit for encrypting data exchanged with external devices to maintain security. Memory 506 is, for example, a EEPROM or flash memory and stores user traffic information, including information related to trains a user is expected to travel on (for example, a departure station, destination, train name, and a reservation seat number) and a computer program for controlling the wristwatch. Central control circuit 505 reads the computer program from memory 506 to manage all operations of the wristwatch.

1-B: Operation of the First Embodiment

Figure 12:
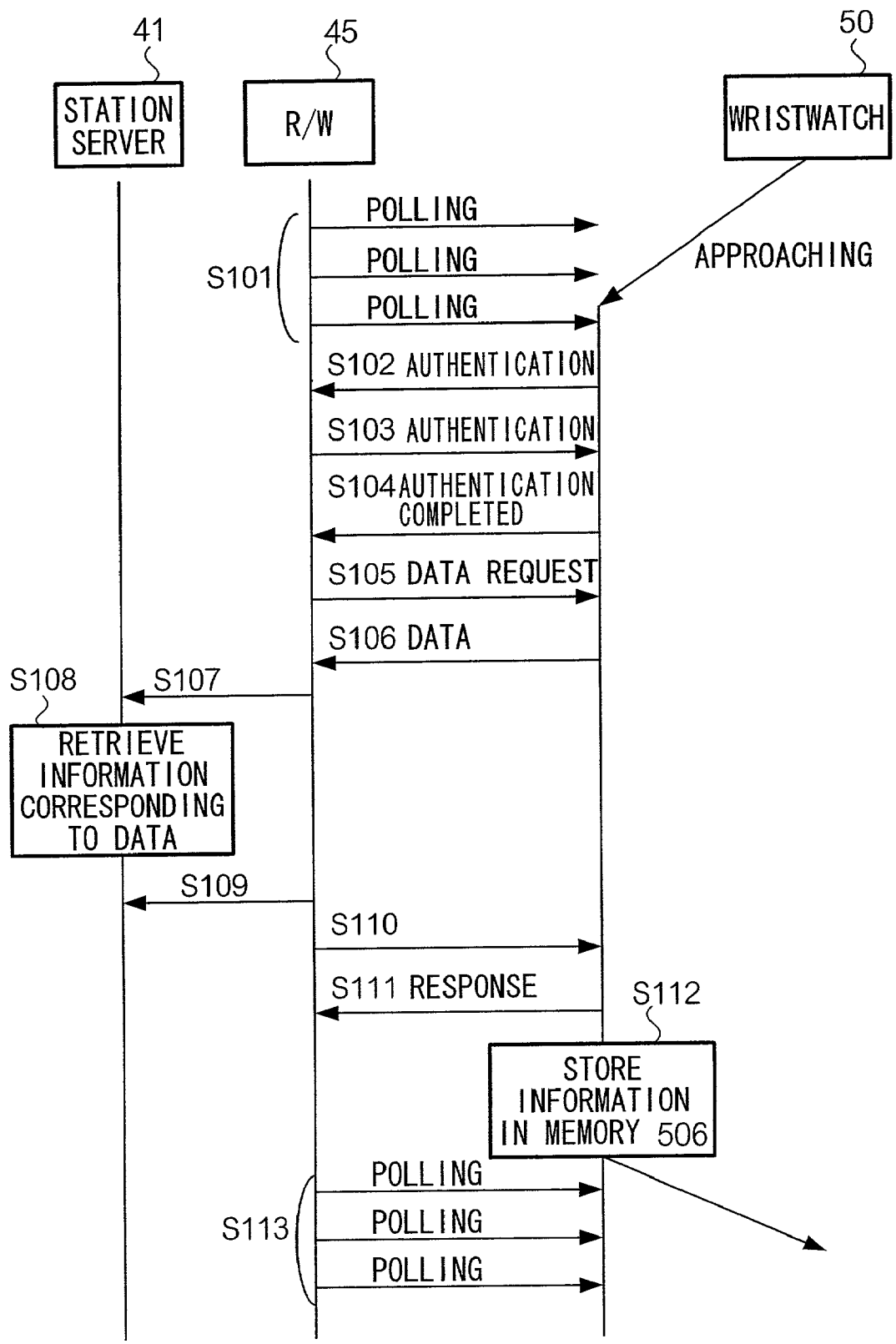
FIG. 12 is a flowchart showing operation of the watch 50.

The outline of an operation followed by a concrete operation will now be described in reference to gate terminal G of FIG. 7. 1-B-1: Outline of the operation The outline of the operation of system 100 will now be described referring to a sequence chart FIG. 12. Read/write circuit 45 transmits polling signals (communication request signals) at certain periods (step S101). When a wristwatch 50 comes within a predetermined distance where a read/write device 45 can communicate and wristwatch 50 receives the polling signal, communication by radio starts between wristwatch 50 and read/write device 45.

At first wristwatch 50 transmits a signal containing an ID for representing communication readiness and a demand of authentication to read/write device 45 (step S102). When read/write device 45 receives the signal, it recognizes that wristwatch 50 is within communication range and thus bi directional communication is ready and performs authentication with the received signal.

If authentication fails, read/write device 45 transmits an authentication failure signal and conducts no further communication with wristwatch 50. In addition, gate 45f (FIG. 7) is caused to be closed to prevent the passage of the user. If authentication is completed, read/write device 45 transmits an authentication complete signal to wristwatch 50 (step S103). When the wristwatch receives the signal from read/write device 45, it transmits a signal confirming authentication to read/write device 45 (step S104). Next read/write device 45 transmits a data demand signal to the wristwatch 50.

When wristwatch 50 receives the demand it transmits user traffic information stored in memory 506 (FIG. 11) including train names, reservation seat number as data to read/write device 45 (step S106). When read/write device 45 receives the data, it forwards it to a station server 41 (FIG. 2) in which device 45 is provided (step S107).

When station server 41 receives the data, it determines whether to permit the user to pass through the gate. For example, when a user is about to exit a station though gate terminal G, station server 41 checks ticket data to determine whether a destination designated by the data coincides with a station where gate terminal G is located. If incongruence is found in the data, the read/write device carries out a prescribed operation such as closing gate 45f (FIG. 7) to prohibit passage of the user. If the data is judged as being correct, read/write device 45 accesses memory 43 (FIG. 3) to extract information about trains corresponding to the data. For example, read/write device 45 accesses urgent information memory 43c to check whether any corresponding train service is delayed or suspended (step S108). Subsequently, read/write device 45 accesses optional memory 43d to extract service information corresponding to the user based on the ID receipt from wristwatch 50 and transmits any urgent information and service information to wristwatch 50 through read/write device 45 (steps S109 and S110).

When wristwatch 50 receives the service information, it transmits a response signal indicating receipt of the information to read/write device 45 (step S111). Next wristwatch 50 writes the information into memory 506 (step S112) and displays the information on display unit 514 for viewing by a user. When read/write device 45 receives a response signal, it recognizes completion of the data communication with wristwatch 50 and carries out an operation such as opening the gate. Finally, read/write device 45 enters a next polling operation ready state.

Figure 13:
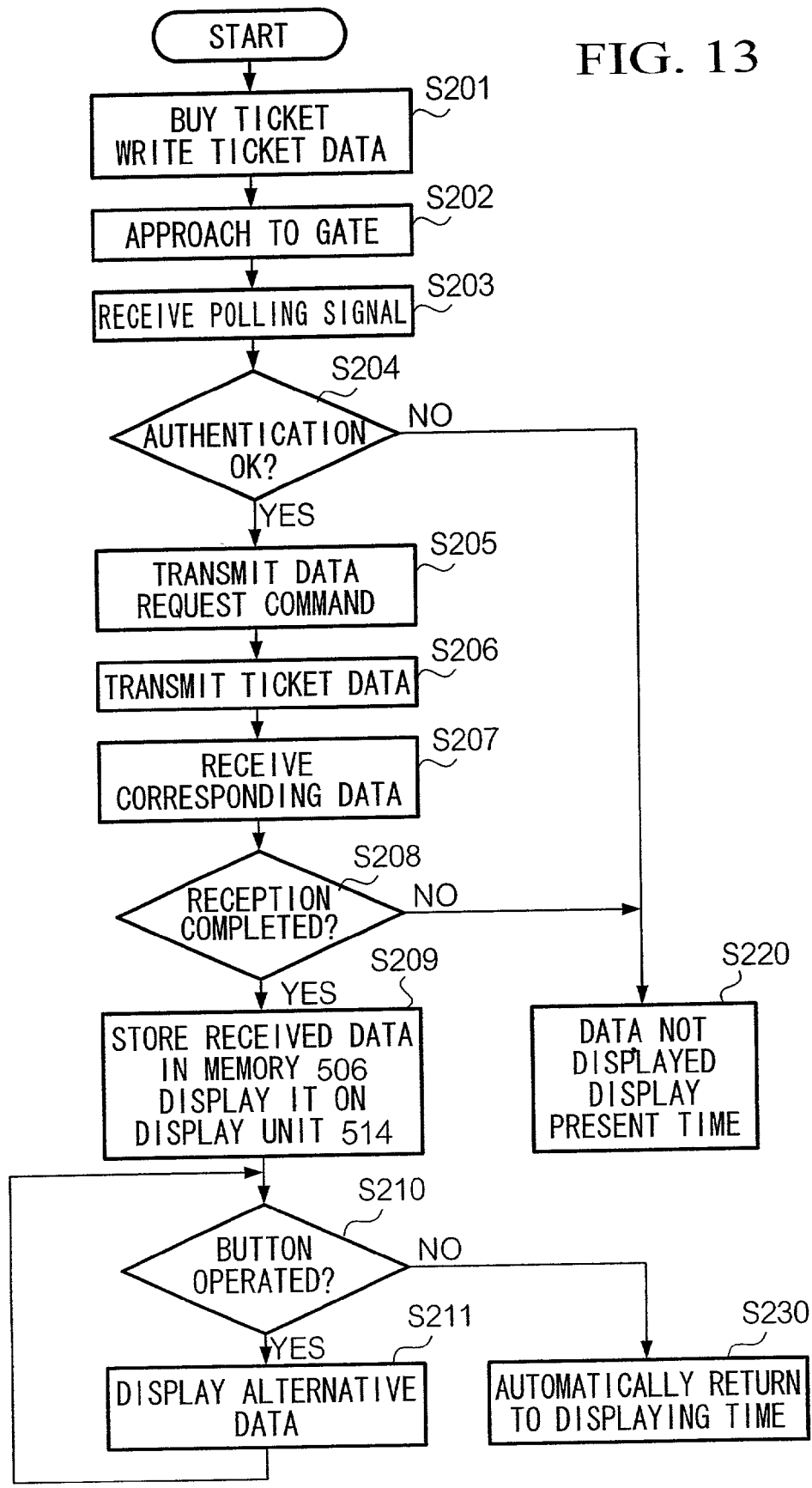
FIG. 13 illustrates circulation of service information.

1-B-2: Outline of the Operation from the Wristwatch 50 Side:

From the side of wristwatch 50 the outline of the outline of the operation described above will again be described, but this time with reference to FIG. 13. FIG. 13 is a flowchart showing operations of wristwatch 50.

A user of the wristwatch, who wishes to use system 100, buys a ticket (which ticket may include a season ticket) at a railway ticket sales window. Specifically, when the user pays a fare for a ticket, data corresponding to the ticket information is written by a machine provided at the sales point (not shown in FIG. 13) in memory 506 of wristwatch 50 (step S201). It is also possible for the ticket to store information about a section of track or simply an amount of prepaid money (balance). When the user wearing wristwatch 50 approaches a ticket gate of station system 40 where read/write device 45 is provided (step S202), wristwatch 50 comes within radio communication distance of the system. When wristwatch 50 receives polling signals from read/write device 45 (step S203), wristwatch 50 transmits a signal for authentication to read/write device 45 (step S204).

If wristwatch 50 does not receive an authentication completion signal from read/write device 45 (step S204; NO), wristwatch 50 discontinues communication with read/write device 45. In such a case, a time continues to be displayed on display unit 514 since no information for display is received by wristwatch 50 from read/write device 45 (step S220). If wristwatch 50 receives an authentication completion signal (step S204; YES), it transmits an authentication confirmation response signal to read/write device 45 (step S205). When wristwatch 50 receives a data demand signal from read/write device 45, wristwatch 50 transmits data stored in memory 506 to read/write device 45 (step S206). When wristwatch 50 receives information corresponding to ticket information and service information from read/write device 45 (step S207) and reception is completed (step S208; YES), it stores the receipt information in memory 506 and displays the information on display unit 514 (step S209).

In the case that wristwatch 50 receives a large amount of data, display unit 514 is not able to display all of it simultaneously. Consequently, wristwatch 504 displays a part of data stored in memory 506 which can be displayed on display unit 514 when the user presses a prescribed button (not shown) (step S210; YES) (step S211).

In the case that the button is not pressed during a certain period of time after displaying information received from read/write device 45 (step S210; NO), the display unit shows a time instead of information (step S230). Even in the case that the user moves out of radio communication distance from read/write device 45, the user is still able to push the button to retrieve and display information stored in memory 506 of wristwatch 50.

1-B-3: Details of the operation:

This operation will now be described in more detail with reference to FIG. 4. In the following, suppose that a user with wristwatch 50 intends to ride X-railway at A station, get off at B station, transfer there to Y-railway, and get off at C station.

Suppose that a ticket data stored in the memory 506 of the wristwatch 50 includes the following information:

1. Departure station; A station
2. Destination; B station
3. Reserved train name; Y-railway, limited express No. 1 (from B station to C station)
4. Reserved seat number; No.1 in car 1

It will now be described how and what information a user obtains from station systems 40 of A station and B station under the above conditions.

1-B-3-1: Information the user obtains from station system 40A

At first, it will now be described what information is provided to the user at A station. Station server 41 within station system 40 of A station receives the above-mentioned ticket data through one of its read/write devices 45, provided at A station, and collects the following information.

(a) Information about a route from the departure station to the destination:

The station server 41 of A station recognizes that the user's departure and destination stations are A and B stations, respectively. Next it accesses traffic route memory 43x and determines that the user should transfer at B station. Next it determines an appropriate route for the user, in other words, that the user should go to B station by X-railway then to C station by Y-railway.

(b) Information about a train designated by a user:

Judging from the ticket data including information that the user will use limited express no. 1 of Y-railway from B station to C station, station server 41 of A station accesses timetable memory 43b to retrieve information about the train (departure time, platform number at which the train will arrive in). In addition, it accesses its urgent information memory 43c to check whether the train is delayed or suspended. In checking its urgent information, it is preferable that station server 41 of A station demand transmission of the most recent available information from system server 10.

(c) Information about a transfer station:

In this example, the transfer station is B station. System server 41 of A station determines a route in transferring from X-railway to Y-railway at B station by referencing platform information 431 (FIG. 5) and platform guide map 432 (FIG. 5) stored in transfer station memory 43a of B station.

To be more specific, judging from platform information 431, station server 41 of A station determines that the user should move from platform no. 1 to platform no. 3 at B station to transfer from X-railway to Y-railway. And judging from the platform guide map 432, it determines what route the user should follow from platform no.1 to no.3.

In addition, station server 41 of A station calculates the time available to the user at B station. Specifically, the amount of time available for transfer is calculated based on the time required to travel from A station to B station, which information is calculated by accessing timetable memory 43b, departure time of the train designated by the ticket data (limited express no. 1 of Y-railway), and the present time.

Figure 14:
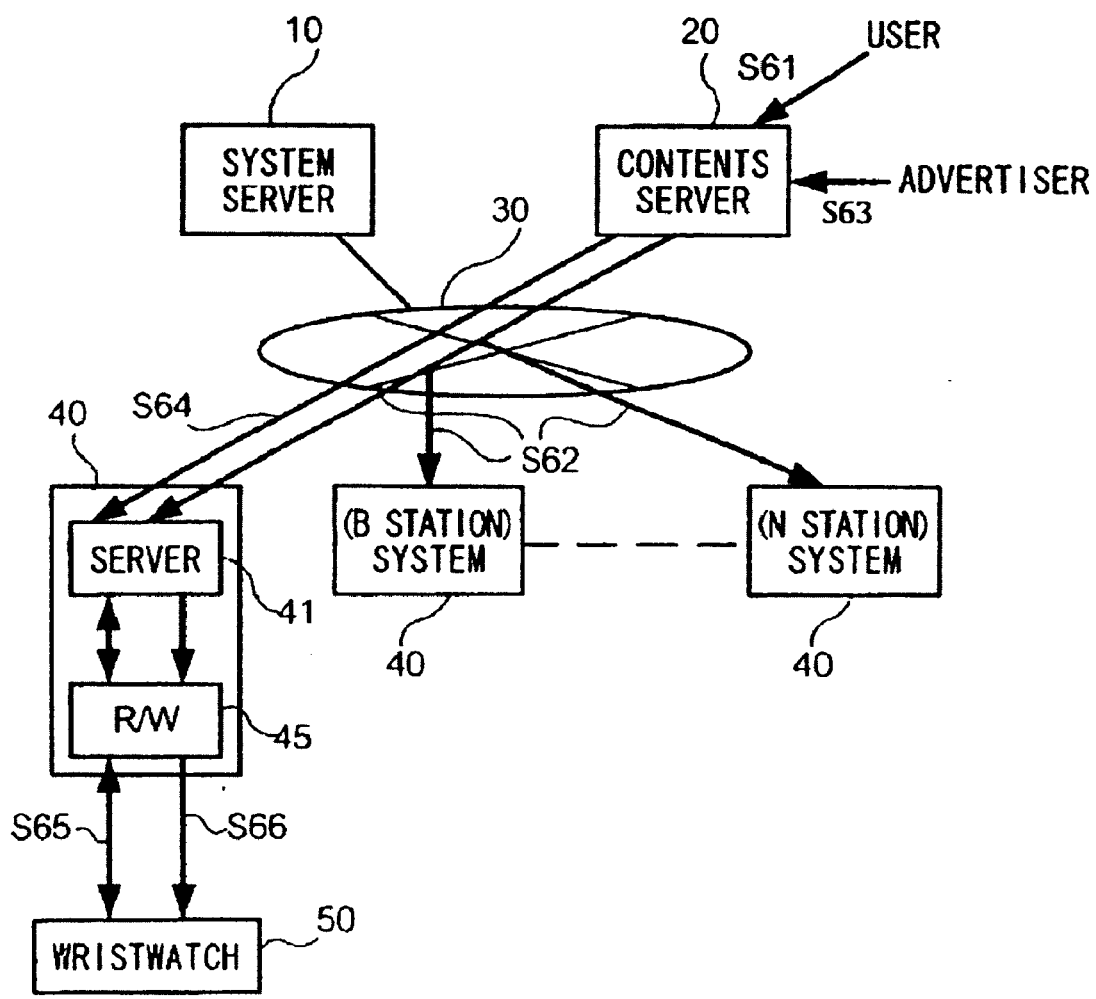
FIG. 14 shows the flow of additional services information.

(d) Optional information:

FIG. 14 shows the flow of service information other than the above transportation information. Service information is, for example, information about restaurants around a station or contents such as news.

An information provider, such as the owner of a restaurant, can register with contents server 20 an advertisement including location, business hours, and sales offers by accessing contents server 20 (step S63) and paying a fee, for example. Registered contents are sent to corresponding station server 41.

A user accesses, in advance, contents server 20 to register contents, or service information, the user wishes to obtain in association with an ID number which uniquely identifies the user's wristwatch 50 (step S61). For example, a user registers requests for information on restaurants in the surrounding area of a station and sports news as service information. Contents server 20 transmits the registered contents to the corresponding station server 41 (step S64) to store it in optional memory 43d.

After registration by an information provider and a user of a wristwatch 50 is finished, firstly, authentication and fare adjustment is carried out in communication between a wristwatch and a read/write device 45 (step S65). In the fare adjustment operation, a computer program for adjusting the fare and stored in station server 41 of A station is used. Secondly, the station server 41 identifies an ID number to determine whether it has service information to be transmitted to the user's wristwatch having the corresponding ID number. If affirmative, the station server transmits such information via read/write device 45 to the wristwatch 50 (step S66). Information is transmitted to the wristwatch in the manner described above. In other words, a user is not only able to pay transportation charges automatically, but is also able to obtain prescribed information on the basis of a registered ID number.

Figure 15:
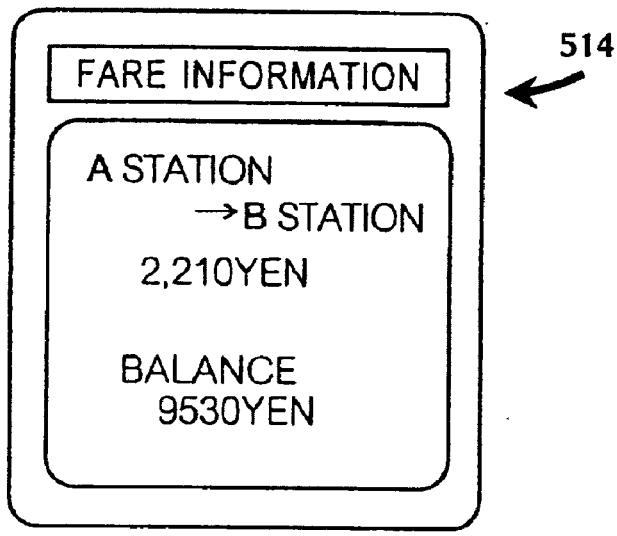
FIG. 15 shows an example of contents of the display unit 514.

FIGS. 15 through 20 shows examples of information which is transmitted from a station server 41 and displayed on display unit 514 of a wristwatch 50. FIG. 15 shows an example of a display unit 514 showing a station a user travels on, a fare the user paid, and the balance after a fare adjustment operation is carried out at a ticket gate terminal G.

Figure 16:
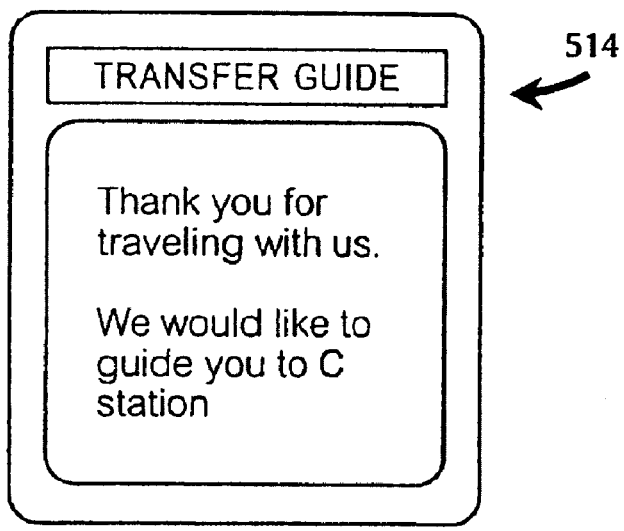
FIG. 16 shows an example of contents of the display unit 514.
Figure 17:
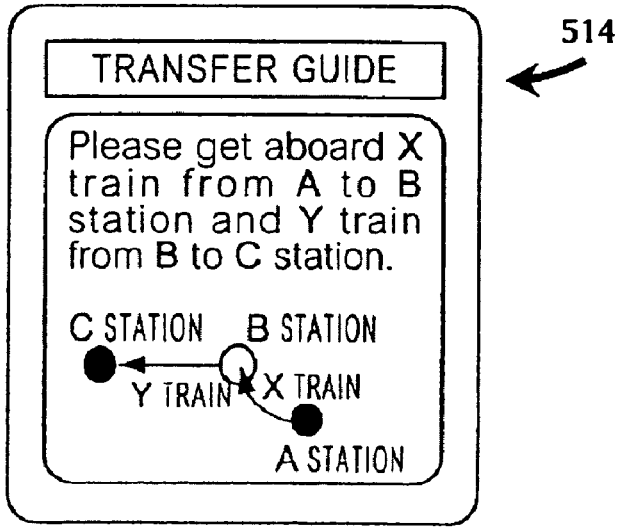
FIG. 17 shows an example of contents of the display unit 514.

At the beginning when transportation information is provided, an image shown in FIG. 16 is displayed on unit 514, for example. FIG. 17 shows information about a route that a station server 41 has determined based on ticket data, including the departure station and destination station of a user. The user can readily understand how to travel from A station to C station; and not only is a text explanation made available for display, a graphic explanation is also made available.

Figure 18:
FIG. 18 shows an example of contents of the display unit 514.

FIG. 18 shows information displayed about trains that a user should take. Also displayed is the time available for the user to transfer at B station, in addition to a departure time and a reserved seat on trains designated by the user. By obtaining such information in this way, a user may proceed at his or her leisure at B station, for example.

Figure 19:
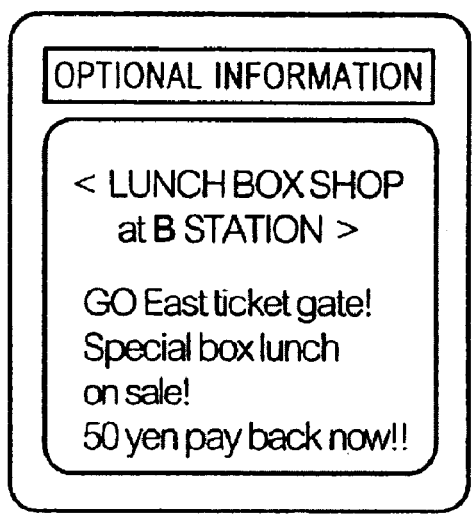
FIG. 19 shows an example of contents of the display unit 514.
Figure 20:
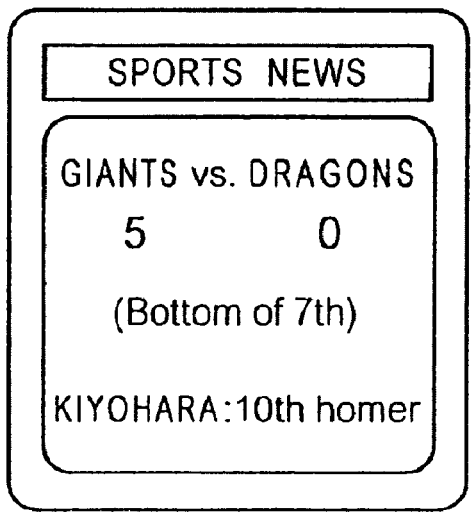
FIG. 20 shows an example of contents of the display unit 514.

FIG. 19 shows optional information about a lunch box shop available in the vicinity of B station. As shown, the user can also obtain information related to the transfer station, while still at A station. By obtaining such information in advance, the user can manage time in transferring at B station efficiently.

It is possible for the above displayed images shown in FIGS. 15 through 20 to be automatically switched, for example, every ten seconds by central control 505 of the wristwatch 50, or for the user to operate external input unit 507 to switch images. Further, it is possible for sound generation unit 511, vibration unit 512, or light-emitting unit 513 to be driven to notify the user when the mobile wireless device is receiving information.

1-B-3-2: Information the user obtains from the station system 40 of B station:

There will now be described contents of information a user obtains at B station (transfer station). When station server 41 of B station receives ticket data from wristwatch 50 through one of its read/write devices 45, it collects the following information.

(a) Information about a route from a departure station to a destination station:

First, station server 41 of B station recognizes that the staffing station is A station, and the destination station is C station. Then it accesses railroad route memory 43x of the station server 41 of B station to determine that B station is the transfer station, and that the user should take Y-railway from B station to C station, taking into consideration that the user is presently in B station.

(b) Information about trains designated by a user:

As mentioned above, ticket data includes the information that the user will proceed from B station to C station by train (limited express no. 1 of Y-railway). Therefore the station server 41 of B station accesses timetable memory 43b to retrieve information related to the train, such as a departure time at B station and a platform number from which the train will depart. It also accesses urgent information memory 43c to check whether the train has been delayed or suspended.

(c) Information about the transfer station:

The station server 41 of B station accesses to the transfer information memory 43a and refers to platform information 431, thereby recognizing that the user should move from platform no. 1 to no. 3, to transfer from X-railway to Y-railway at B station. Next, it refers to platform guide map 432, to determine which routes the user should follow in moving from platform no. 1 to no. 3. Additionally, it calculates the time available to the user in which to complete the transfer, based on the departure time of the train (limited express no. 1 of Y-railway) and the present time. After retrieving this information, the station server 41 of B station transmits it to wristwatch 50 through read/write device 45.

Figure 21:
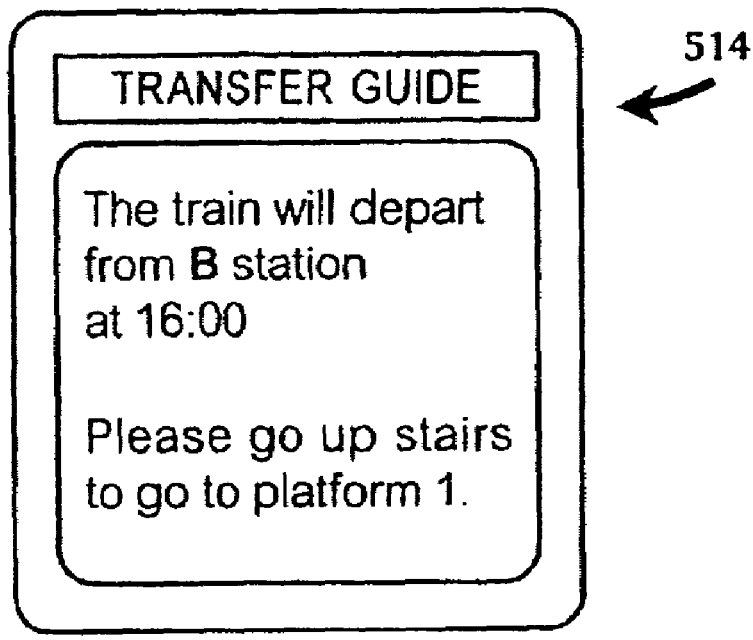
FIG. 21 shows an example of contents of the display unit 514.
Figure 22:
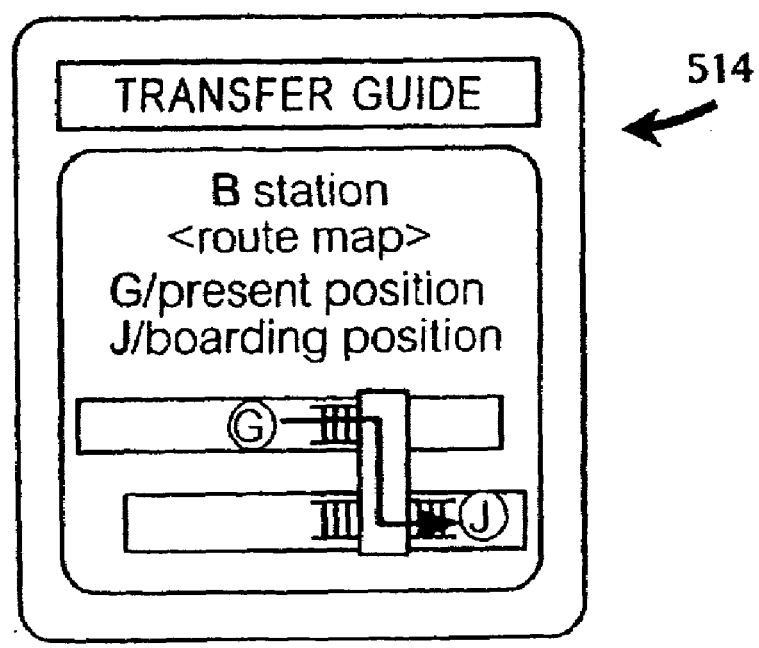
FIG. 22 shows a modification of the transfer information system based on the first embodiment.

FIGS. 21 and 22 show that information received by wristwatch 50 is displayed on display unit 514. FIG. 21 shows that information about the train designated by the user (limited express no. 1 of Y-railway) is displayed. When viewing display unit 514, the user immediately understands that the train will depart on schedule and it would be best to use the stairs to go to platform no. 3. Preferably, a graphic representation providing a guide map of B station and a route to be taken in transferring is provided, as shown in FIG. 22. In addition, information on a present location (G) of the user and a boarding point (J) corresponding to a car of the train the user is expected to ride on, and available stairs is provided to prevent the user from becoming lost at B station. If there are a variety of possible routes, the station server 41 of B station specifies the most appropriate one (for example, the stairs nearest to boarding point (J) are selected) and this information is transmitted to the user to enable efficient transfer.

Figure 23:
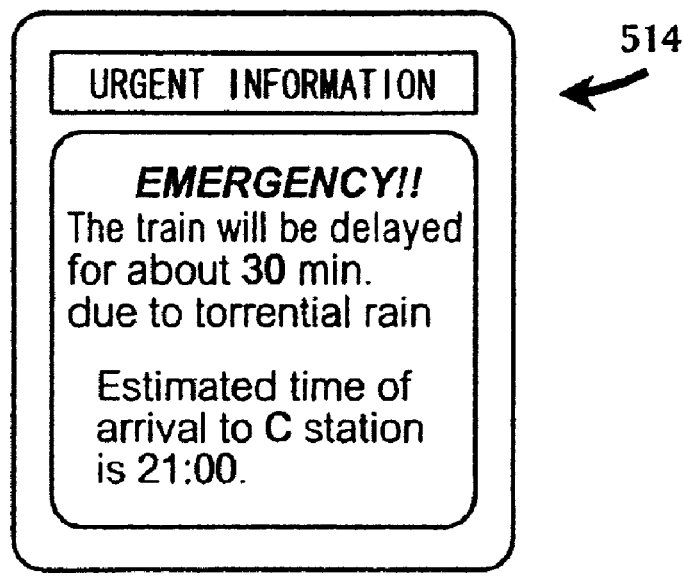
FIG. 23 shows an example of contents displayed in a portable wireless device based on the second embodiment.
Figure 24:
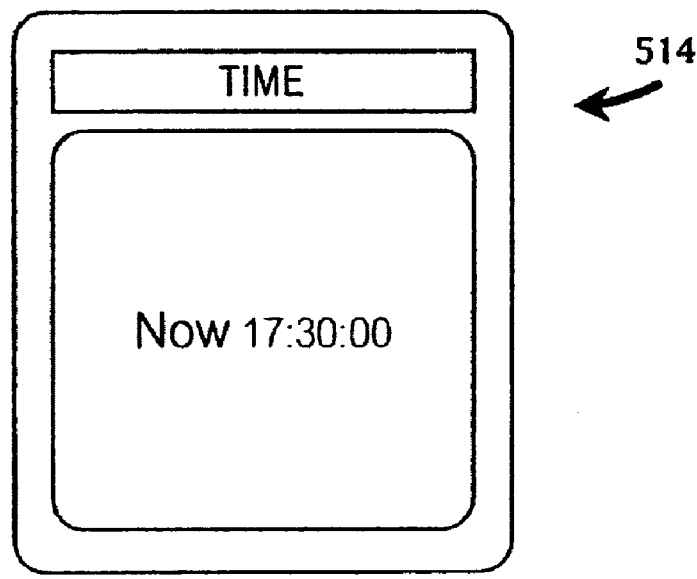
FIG. 24 shows an example of contents displayed in a portable wireless device based on the second embodiment.

FIG. 23 shows display of information about a delay of a train service. In case that a train service is delayed or suspended, a user can obtain real time information without the need to consult a station employee or listen to information broadcast in stations. In FIG. 24 a time is displayed on display unit 514. It is possible for wristwatch 50 to additionally receive information about a news flash or up-to-the-minute sports news in addition to a displayed time.

Up to this point the system 100 has been described. In using system 100, a user with wristwatch 50 having information about a departure station, destination, trains which the user is expected to take, and other related information, such as ticket data, so that the user can easily obtain information about not only transfer stations but also urgent delays or suspensions in services of trains.

C: Supplement (1) In this embodiment the user needs to transfer only once at B station.

However, this invention is applied similarly to a case in which the user has to transfer two or more times. Suppose that a user is expected to travel from A station to B station using a traffic route shown in FIG. 4. In this case, the station server 41 of A station determines that B and D stations are the transfer stations by referring to the railroad route memory 43x. Then the station server 41 of A station collects information about B and D stations, respectively, by referring to transfer station memory 43a and transmits it to wristwatch 50. From this, the user is able to determine that it is necessary to transfer at B station and at D station, and to obtain information relating to B and D stations (including a route and time available for transfer at each station). A fare can be paid at either a departure station or destination station.

(2) In the above embodiment, the system of the present invention is applied to railways, but it is possible for the system to be applied to other traffic means such as buses or airplanes. In the case of, for example, bus or air travel one or more read/write devices can be provided at bus stops and within airports. Furthermore, this system can be applied to a combination of transportation means such as transferring from a train to a bus or from a train to an airplane. In this case, timetable memory 43b stores timetables of each of transportation means.

(3) In addition to providing read/write devices 45 at ticket gates, it is also possible for them to be provided beside kiosks, stairs, escalator, or passageways in a station. In this way, users are able to access required information with at any time and potentially at any place in an area of travel. As such, the present invention contributes greatly to the ease and convenience of travel of a user.

Figure 25:
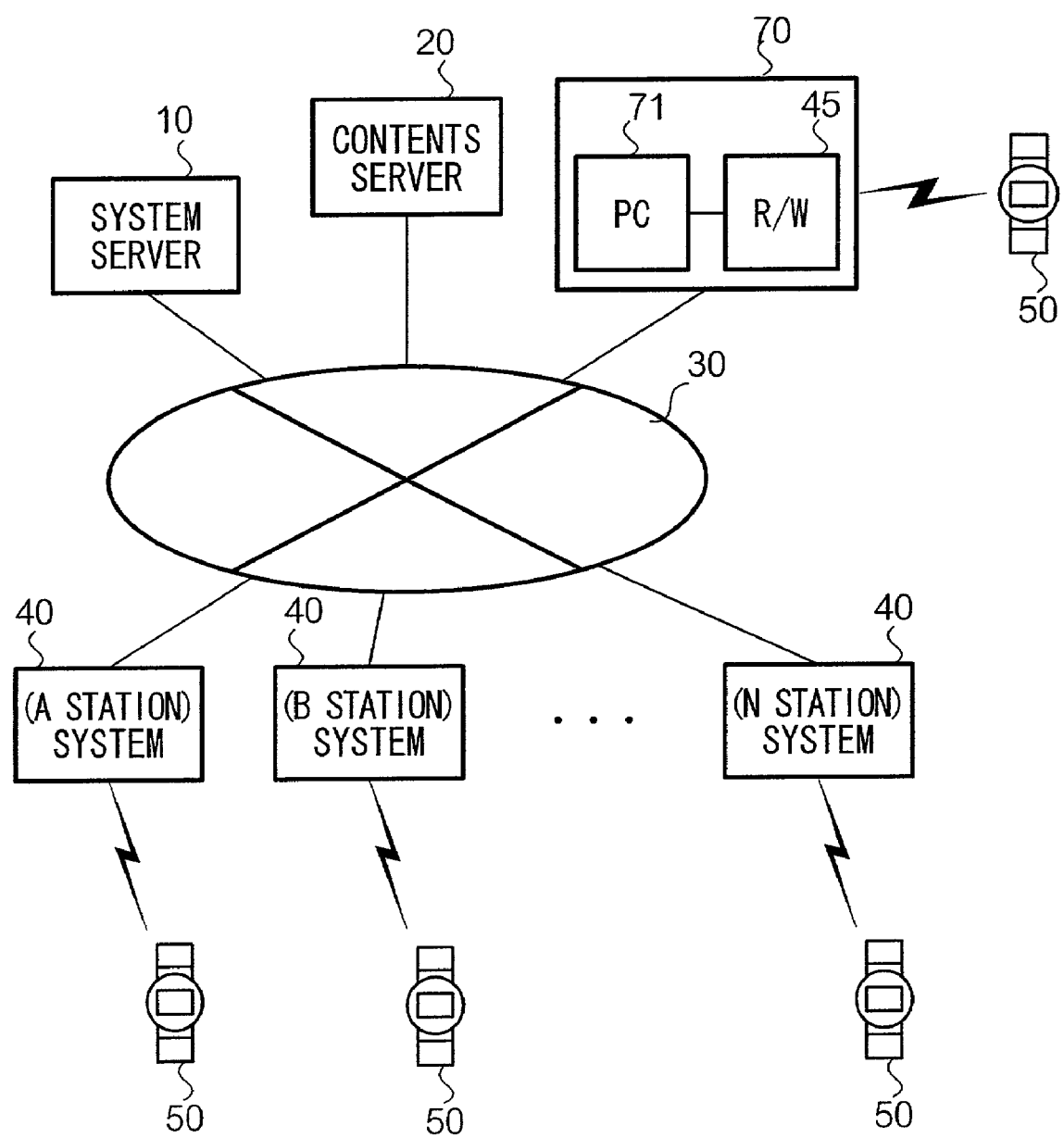
FIG. 25 shows an example of a personal system including a personal computer (PC) connected to through a public network to a read/write device 45.

(4) FIG. 25 shows an example of a system in which a personal system 70 comprising a personal computer (PC) 71 connected to a read/write device 45 is connected to a public network 30.

In this system, it is possible for data communication to be carried out by software installed in the PC 71. This personal system 70 is provided at an office or a home, and a user can obtain information about trains and stations and other traffic information while at home or in a office. Furthermore, it is possible for a computer program stored in a memory 506 of a wristwatch to be rewritten by downloading a new program via the read/write device 45 connected with a PC and the Internet. This helps a user update the program or correct attributes. Preferably, a user is able to update the program for controlling a wristwatch and via read/write devices at a ticket sales window, kiosk, and information desk in a station. It is possible for the program to be distributed via computer readable storage media such as a CD-ROM, MO, and flash memory.

(5) A method for the authentication between a wristwatch 50 and a read/write device 45 is arbitrary. The authentication between a wristwatch and a read/write device 45 is carried out based on the ID number uniquely assigned to the wristwatch 50.

(6) It is possible for station server 41 to have all of the same functions as contents server 20. That is, a user registers service information that he/she wishes to receive in a station server 41 and each optional information memories 43*d* of all station servers 41 stores the service information. On the contrary, optional memory 43*d* is may be provided outside of station server 41. For example, an additional server for storing optional information (hereinafter referred to as a common server) can be introduced to enable service information to be shared. In this case, firstly, service information is transmitted via a public network from the common server to a station server and secondly from read/write device 45 to wristwatch 50. It is possible for only station servers of major station 41 at which a plurality of railways are available to have a large amount of information stored in their own memory 43. In this case, station servers which do not have a personal memory 43 obtain information from station server 41 of a major station, which is equipped with memory 43 via a private or public network.

(7) The portable wireless device in this embodiment is a wristwatch capable of communicating by radio. However, the portable wireless device of the present invention is not limited to a wristwatch. For example, a calculator, PDA (personal digital assistants), electronic translator, pedometer, sphygmomanometer, mobile phone and other easy-to-carry devices can be used. The wireless mobile device can be of any shape, including, but not limited to a card or pendant. In this embodiment, received information is displayed in display unit 514. However, it is possible for the information to be provided to the user by sound, for example.

(8) In this embodiment a bi-directional radio communication scheme is arbitrary. It is only required that communication by radio is carried our over a close range. For example, Bluetooth (trademark) in which data communication is carried out in a short range using 2.45 GHz radio frequency band is available.

2. Second Embodiment

In this embodiment, the present invention is applied to a room entry/exit management system. An information distribution device in this embodiment has read/write devices and a memory for storing a user ID and information. An information distribution device is provided in the vicinity of each door of a room and has the function of locking, unlocking, opening and closing the door. A mobile wireless device has a display unit and a user ID for identifying the user.

Figure 26:
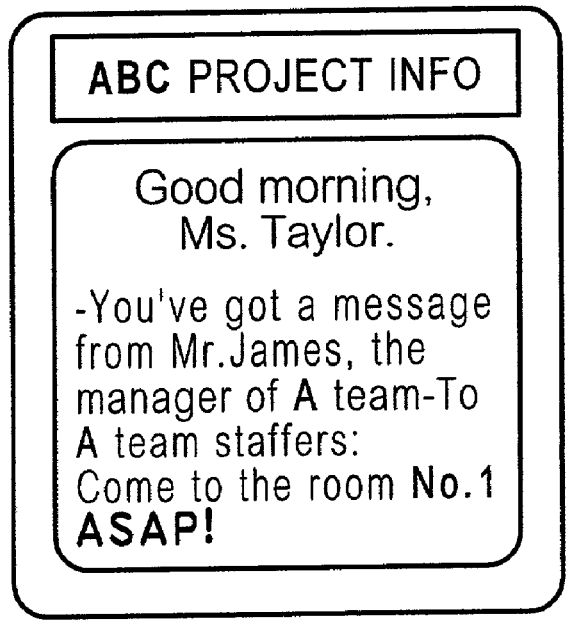
FIG. 26 shows an example of contents displayed in a portable wireless device based on the second embodiment.

When a user with the mobile wireless device, who wishes to enter a room, stands in front of its door, radio communication is carried out between the mobile device and the information distribution device through a read/write device. Specifically, when the mobile wireless device receives a communication demand signal via the read/write device, it transmits the stored user ID. The wireless information distribution device receives the user ID via the read/write device and verifies the ID. If authentication is completed, the wireless information device controls the read/write device to unlock or open the door to allow the user to enter the room. At the same time, the wireless information distribution records information corresponding to the user on the basis of the user ID and information stored in the wireless information device and transmits it to the mobile wireless device. The mobile wireless device receives the message and displays it on the display unit. FIG. 26 is an example of an image displayed on the display unit. As shown, a user is able to receive specific messages corresponding to an ID. Further, if similar communication between the two devices and a door controlling operation are carried out when a user exits the room, a state of occupancy of the room, including information about who has used the room and at what time, can be readily determined.

3. Third Embodiment

Figure 27:
FIG. 27 shows an example of contents displayed in a portable wireless device based on the third embodiment.

In this embodiment, the present invention is applied to a system for an amusement park. FIG. 27 shows an example of information displayed on a mobile wireless device carried by a visitor of the amusement park. In this embodiment, the mobile wireless device comprises personal information such as ID number, age, sex, and preferences other than ticket information bought at a sale window. The read/write devices are equipped at entrance gates of the park. When a user approaches the gate, the mobile wireless device communicates with the wireless information distribution device through the read/write device by radio. As a result, information based on the personal information in addition to the amusement park information is displayed in the mobile wireless device as shown in the figure. By using this system, not only a user acquires information about the amusement park but also an administrator of the amusement park provides a message corresponding to each user to provide a sense of familiarity.

It is preferable for the read/write devices to be provided at entrances of each facility in the park. For example, when a user who wishes to use a facility approaches a gate of the facility radio communication between the mobile wireless device and the information distribution device is carried out. Service information based on the personal information stored in the ticket is provided to the user from the wireless information distribution device. For example, a notice that a user cannot use a facility because of the age limit is displayed. It is preferable for some explanation of the facility or other facilities to be displayed during a waiting period.

4. Fourth Embodiment

Figure 28:
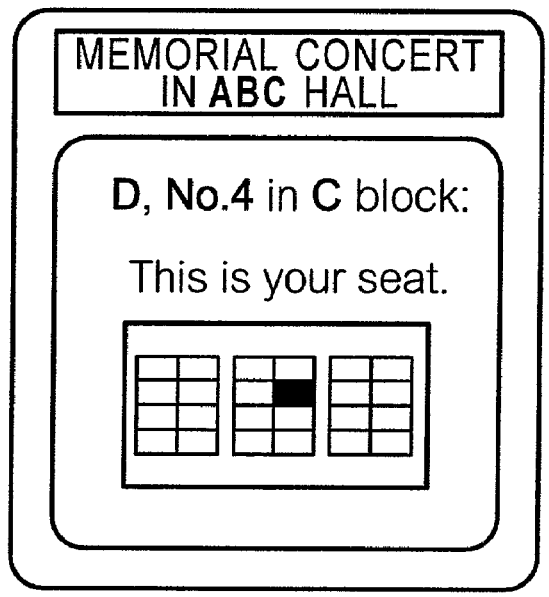
FIG. 28 shows an example of contents displayed in a portable wireless device based on the fourth embodiment.

FIG. 28 shows an example of information displayed on a mobile wireless device in a case where the present invention is applied to a concert ticket management system. When a user buys a concert ticket, seat information is stored in the mobile wireless device of the user. At the same time, the wireless information distribution device stores a user ID for identifying the user and ticket information the user bought, including a name, date, venue, and start time of the concert.

When a user proceeds to a concert hall with the mobile wireless device and the mobile wireless device is brought close to a read/write device provided at an entrance, bi-directional radio communication is carried out between the wireless mobile device and a wireless distribution device through the read/write device. Specifically, when the mobile device receives a communication request signal via one of read/write devices, it transmits the user ID. When the information distribution device receives the ID via the read/write device, it verifies the ID. If it judges that the user is qualified on the basis of the ID, it permits the user to enter by, for example, opening a gate. At the same time, it transmits image data of the position of the seat reserved by the user via the read/write device to the mobile wireless device. As a result, the position of the seat is displayed on the display unit as shown in FIG. 28. This enables a user to determine his or her own seat easily and accurately.

Furthermore, it is possible for the read/write devices to be provided at each seat and service to be used by the user, which information each is registered beforehand, and is distributed to the user via each the read/write device. The information could, for example, be about music currently playing, including its name, composer and musician.

5. Fifth Embodiment

Figure 29:
FIG. 29 shows an example of contents displayed in a portable wireless device based on the fifth embodiment.

In this embodiment, the present invention is applied to an electronic monetary system. FIG. 29 shows an example of information displayed on the mobile wireless device. In the system of this embodiment, electronic monetary information is stored in the mobile wireless device. For example, when a user with the mobile wireless device pays for goods, the user brings the mobile wireless device close to a read/write device provided at a checkout. Then wireless information distribution device communicates with the mobile wireless device by radio through the read/write device, a transaction involving electronic money takes place. Therefore, a user need not have to hand over a credit card for processing, which enables security to be enhanced. In addition, merchandise information, advertisement of goods, and points a user has accumulated are distributed to the user on the basis of personal information stored in the mobile wireless device, such as ID number, sex, age, and taste. FIG. 29 shows displayed image on the basis of personal information that the user is a woman in her twenties. Thus, by using this system, a seller can prevent inappropriate sale of liquor and cigarettes, by confirming an age of a user which is included in the personal information.

Although specific description for the second through fifth embodiment is omitted, a configuration and method for controlling a wireless information distribution device and mobile wireless device in those embodiments in the present invention is optimized according to the above embodiments. It is therefore obvious that either a computer program for controlling a wireless information distribution device and mobile wireless device and a storage medium for it can be modified as required.

Although the above description provides many specific examples, these enabling details should not be construed as limiting the scope of the invention, and it will readily understood that the present invention is susceptible to many modifications, adaptations, and equivalent implementations without departing from its scope and without diminishing its attendant advantages.

The invention claimed is:

1. A wristwatch comprising:
    a transmitting and receiving unit for carrying out radio communication with an external transmitting and receiving device of a wireless information distribution device;
    a memory for storing a service information request including predefined user preferences;
    a display; and
    a control unit, for automatically transmitting a communication ready signal and said service information request to said external transmitting and receiving device in response to coming within range of said external transmitting and receiving device;
    wherein if reception of service information from said external transmitting device is successful, then the service information received from said external transmitting and receiving device in response to said service information request is stored in said memory and automatically displayed on said display, else if reception of said service information is unsuccessful, then said display is unaffected by the unsuccessful reception of service information.

2. The wristwatch of claim 1, wherein:
    said memory further stores user information for identifying a user; and
    said service information request includes said user information along with a user entry or exit request.

3. The wristwatch of claim 1, wherein:
    said user preferences are stored in said memory as user attributes;
    said service information request includes said user attributes; and
    said service information sent from said transmitting and receiving unit corresponds to said user attributes.

4. The wristwatch of claim 1, wherein:
    said memory stores user transportation information including a departure point and destination point of a user;
    said service information request includes said user transportation information; and
    said service information sent from said transmitting and receiving unit includes information about movement of a transportation means specified in said user transportation information.

5. The wristwatch of claim 1, wherein:
    said service information request is for user transportation information on a transportation means, including a departure point and a destination point; and
    said service information sent from said transmitting and receiving unit includes information on said transportation means, transfer points, and methods for transferring in traveling from said departure point to said destination point.

6. The wristwatch of claim 1, wherein said transmitting and receiving unit carries out radio communication with said external transmitting and receiving device only upon receiving a communication request signal sent from said external transmitting and receiving device.

7. The wristwatch of claim 1, wherein said display displays the time for a predetermined period after receiving said service information from said external transmitting and receiving device.

8. The wristwatch of claim 1, wherein when said wristwatch is outside range of said external transmitting and receiving device, said wristwatch displays only current chronographic information.

9. A method for controlling a wristwatch in communication with a wireless information distribution device having a memory for storing service information desired by a user of said wristwatch and having an external transmitting and receiving device, said wristwatch having a display and a transmitting and receiving unit for radio communication when within range of said external transmitting/receiving device; said method comprising the steps of:
    in response to entering into a radio communication range of said external transmitting and receiving device, automatically transmitting a communication-ready signal and a service information request including user preferences without user intervention from said wristwatch to said external transmitting and receiving device;

wherein if reception of service information from said external transmitting and receiving device in response to said service information request is successful, then the received service information is stored in said memory and automatically displayed on said display, else if reception of said service information is unsuccessful, then said display is unaffected by the unsuccessful reception of service information.

10. The method of claim 9, wherein said service information request includes user information for identifying said user of said wristwatch, and includes an entry or exit request of said user.

11. The method of claim 9, wherein:

said user preferences are part of user attributes; and said service information received from said transmitting and receiving device corresponds to said user attributes.

12. The method of claim 9, wherein:

said service information request includes user transportation information including a departure point and destination point of said user; and said service information received from said transmitting and receiving device includes information about the movement of a transportation means specified in said user transportation information.

13. The method of claim 9, wherein:

said service information request is user transportation information including a departure point and destination point of a user; and said service information received from said transmitting and receiving device is information about the itinerary of said user including:

a transportation means to travel from said starting point to said destination point;

transfer points: and methods for transferring at said transfer points;

wherein said itinerary corresponds to said user transportation information included in said service information request.

14. The method of claim 9, wherein in response to being outside range of said external transmitting/receiving device, said wristwatch displays only current chronographic information.

15. A computer program product for enabling a computer to control wristwatch, wherein the wristwatch includes:

a memory for storing a service information request including user preferences for information desired by a user of said wristwatch;

a display; and a transmitting and receiving unit for radio communication with a wireless information distribution device when entering in range of an external transmitting and receiving device of said wireless information distribution device; said computer program comprising the steps of:

automatically transmitting to said external transmitting and receiving device via said transmitting and receiving unit, in response to coming within range, a communication-ready signal and said service information request stored in said memory;

wherein if reception of receiving service information from said external transmitting/receiving device is successful, then the service information received from said external transmitting/receiving device in response to, and in corresponding to, said service information request is stored in said memory and automatically displayed on said display else if reception of said service information is unsuccessful, then said display is unaffected by the unsuccessful reception of service information.

16. The computer program product of claim 15, wherein when said wristwatch is outside range of said external transmitting and receiving device, said computer program causes said wristwatch to display only current chronographic information.

17. A computer-readable media storing a computer program for causing a computer to control a wristwatch, wherein the wristwatch includes:

a memory for storing service information request including user preferences;

a display; and a transmitting and receiving unit for radio communication with an external transmitting and receiving device of a wireless information distribution device, when entering in range of said external transmitting and receiving device;

said computer program comprises steps of:

in response to coming within range of said external transmitting and receiving device, automatically transmitting a communication-ready signal and said service information request stored in said memory, via said transmitting and receiving unit, to said external transmitting and receiving device;

wherein if reception of service information via said external transmitting/receiving device in response to said transmitted service information request is successful, then the received service information is stored in said memory and automatically displayed on said display, else if reception of said service information is unsuccessful, then said display is unaffected by the unsuccessful reception of service information.

18. The computer-readable media of claim 17, further comprising the steps of:

in response to being outside range of said external transmitting and receiving device, causing said wristwatch to display only current chronographic information.

* * * * *